(12) United States Patent
Ishigami et al.

(10) Patent No.: US 7,160,138 B2
(45) Date of Patent: Jan. 9, 2007

(54) PACKAGE WITH LOCK MECHANISM

(75) Inventors: Yoshiaki Ishigami, Tokyo (JP); Yoshinori Sunaga, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/118,542

(22) Filed: May 2, 2005

(65) Prior Publication Data
US 2005/0208822 A1  Sep. 22, 2005

Related U.S. Application Data

(62) Division of application No. 10/759,528, filed on Jan. 20, 2004, now Pat. No. 6,945,809.

(30) Foreign Application Priority Data

Jan. 21, 2003  (JP)  ............................... 2003-12678
Oct. 17, 2003  (JP)  ............................... 2003-357871

(51) Int. Cl.
*H01R 13/62* (2006.01)
(52) U.S. Cl. ..................................................... 439/371
(58) Field of Classification Search ................ 439/372, 439/152–160, 544, 76.1, 353, 357–358, 352, 439/377; 361/728, 654, 755–756, 759
See application file for complete search history.

(56) References Cited

U.S. PATENT DOCUMENTS

| | | | |
|---|---|---|---|
| 3,836,938 A | 9/1974 | Barrett et al. | |
| 5,350,312 A | 9/1994 | Kuno et al. | |
| 5,584,712 A | 12/1996 | Fukushima | |
| 6,325,647 B1 | 12/2001 | May et al. | |
| 6,439,902 B1 | 8/2002 | Cole et al. | |
| 6,439,918 B1 | 8/2002 | Togami et al. | |
| 6,533,603 B1 | 3/2003 | Togami | |
| 6,554,626 B1 | 4/2003 | Ramos, Jr. | |
| 6,554,628 B1 | 4/2003 | Aleshevich et al. | |
| 6,731,510 B1 | 5/2004 | Hwang et al. | |
| 6,778,399 B1 | 8/2004 | Medina et al. | |
| 6,786,653 B1 | 9/2004 | Hwang et al. | |
| 6,793,517 B1 | 9/2004 | Neer et al. | |
| 6,855,558 B1 | 2/2005 | Hattori | |
| 2002/0181895 A1 | 12/2002 | Gilliland et al. | |

*Primary Examiner*—J. F. Duverne
(74) *Attorney, Agent, or Firm*—McGinn IP Law Group, PLLC

(57) ABSTRACT

A package with lock mechanism has: a package body to be slidably inserted into a cage and to be releasably locked by the cage; a slide member that is slidably attached to the package body, the slide member allowing the package body to be released from the locking by the cage when the slide member is slid to a predetermined position; and an operation lever that is rotatably attached to the package body. The operation lever allows the slide member to slide to the predetermined position while engaging to the slide member.

1 Claim, 34 Drawing Sheets

PACKAGE WITH LOCK MECHANISM

The present Application is a Divisional Application of U.S. patent application Ser. No. 10/759,528 filed on Jan. 20, 2004 now U.S. Pat. No. 6,945,809.

The present application is based on Japanese patent application Nos. 2003-12678 and 2003-357871, the entire contents of which are incorporated herein by reference.

BACKGROUND OF THE INVENTION

1. Field of the Invention

This invention relates to an optical communication package such as optical transmitter and receiver modules and, particularly, to an optical communication package with lock mechanism detachable to a cage.

2. Description of the Related Art

FIG. 1 is a perspective view showing a conventional optical communication package 40 in state of being attached to a communication device 41 (e.g., U.S. Pat. No. 6,439,918 B1). The package 40 is disposed between an optical fiber (not shown) and the communication device 41 to send optical signal received form the optical fiber to the communication device 41 while converting it into electrical signal, or to send electrical signal received from the communication device 41 to the optical fiber while converting it into optical signal. The package 40 has a socket 5 to allow the optical fiber to be detachably connected thereto and is detachable to the communication device 41 in order to address a case that internal optical and electrical elements has a problem or a case that its communication specifications (optical wavelength, modulation method etc.) are required to conform to those of the other party.

FIG. 2 is a perspective view showing the conventional optical communication package 40 in state of being locked in a cage 2. The package 40 is detachably inserted into the cage 2 mounted on a board 42 in the communication device 41 and is releasably locked by the cage 2. The cage 2 is shaped like a long box extended backward and forward and has an opening at one end (front end), such that the package 40 can be inserted or extracted through the front end. The cage 2 has nails 6 on both sides so as to engage with the internally-inserted package 40 to restrict the movement of package 40 in the extraction direction. The nails 6 are formed like a leaf spring that protrudes inside the cage 2 at the sides and extends backward.

FIG. 3 is a perspective view showing the conventional optical communication package 40 in state of being extracted from the cage 2. FIG. 4 is an enlarged perspective view showing part of the package 40 in FIG. 3. FIG. 5 is an enlarged partially sectioned perspective view showing a locking portion 43 of the package 40 in state of being locked by a nail 6 of the cage 2. FIG. 6 is an enlarged partially sectioned perspective view showing the locking portion 43 in state of being unlocked from the nail 6.

As shown in FIGS. 3 to 5, the package 40 is provided with the locking portion 43 to be engaged with the nail 6 of cage 2 and a release mechanism 44 to release the engagement of locking portion 43 and nail 6. The locking portion 43 corresponds to the back end face of a recess 7 provided on both sides of package body 45, and contacts the free end (back end) of nail 6 being entered into the recess 7. The release mechanism 44 is composed of a slide member 46 that is backward and forward slidably attached to the package body 45 and has a taper 12 to push out the nail 6 from the inside of recess 7. The slide member 46 includes a handle 47 that is located on the front side of package body 45 and extends rightward and leftward. By pulling the handle, the taper 12 is slid into the recess 7. Then, as shown in FIGS. 5 and 6, with the taper 12 being slid into the recess 7, the nail 6 is put out of the recess 7.

The communication device 41, as shown in FIG. 1, has a plurality of openings 48 to each of which package 40 is attached, so that multiple optical fibers can be connected thereto in clumps. Thus, the openings 48 are disposed close to each other on multiple stages formed upward and downward to house packages 40 in clumps.

Since the openings 48 of communication device 41 are disposed close to each other and the handles 47 are closely on the front face so as not to interfere with the connection of optical fiber in the package 40 being locked in the cage 2, the handle 47 is difficult to hold. Further, the release of locking is difficult since the pulling of handle 47 meets resistance from the nail 6.

Further, since the package 40 is drawn out due to friction when the handle 47 is pulled, malfunction may occur in the case that the nails 6 on both sides cannot be simultaneously pushed out from the recesses 7. Thus, in some cases, the handle 47 cannot be taken out easily.

SUMMARY OF THE INVENTION

It is an object of the invention to provide a package with lock mechanism that can be easily taken out from a cage while ensuring the release of locking.

According to first aspect of the invention, a package with lock mechanism comprises:

a package body to be slidably inserted into a cage and to be releasably locked by the cage;

a slide member that is slidably attached to the package body, the slide member allowing the package body to be released from the locking by the cage when the slide member is slid to a predetermined position; and an operation lever that is rotatably attached to the package body;

wherein the operation lever allows the slide member to slide to the predetermined position while engaging to the slide member.

According to second aspect of the invention, a package with lock mechanism comprises:

a package body to be releasably locked by a cage;

a release mechanism that includes an operation lever rotatably attached to the package body, the release mechanism allowing the locking of the package body and the cage; and a restriction member to control the operation lever to stop its rotation at a predetermined position;

wherein the restriction member allows the rotation of the operation lever when the restriction member receives a force exceeding a predetermined value.

According to third aspect of the invention, a package with lock mechanism comprises:

a package body to be releasably locked by a cage; and a release mechanism that is attached to the package body, the release mechanism enabling the release of locking of the package body and the cage;

wherein the release mechanism provides, between an operation member to be operated in the release of locking and a follower member to be driven by the operation member, an allowance to allow the initial movement of the operation member to be independent of the follower member.

According to fourth aspect of the invention, a package with lock mechanism comprises:

a package body to be slidably inserted into a cage and to be releasably locked by the cage; and a release mechanism that is attached to the package body, the release mechanism enabling the release of locking of the package body and the cage;

wherein the release mechanism includes a handle to operate the release mechanism and a handle extension attached to the handle to extend the handle.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
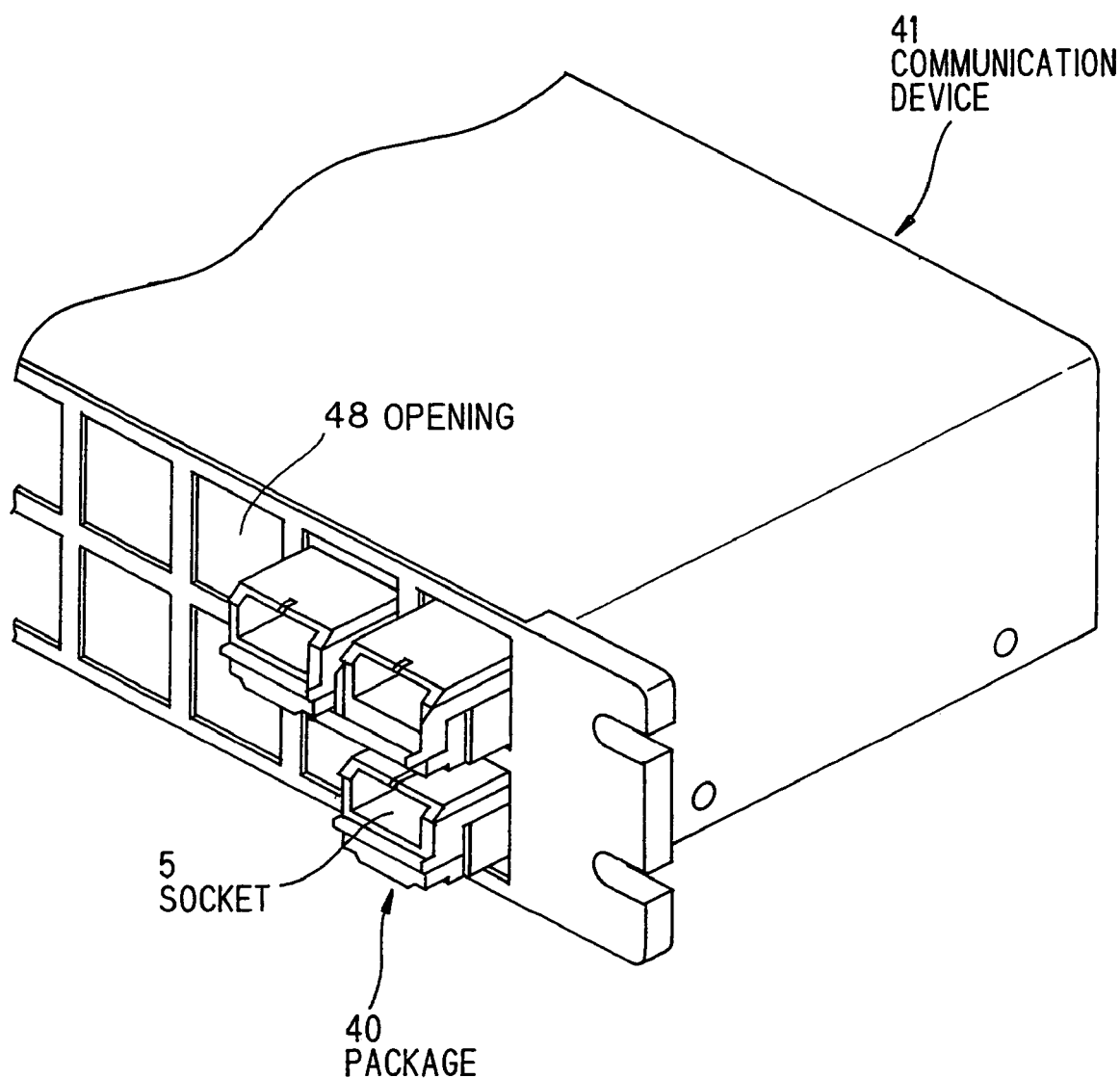
FIG. 1 is a perspective view showing the conventional optical communication package 40 in state of being attached to the communication device 41.
Figure 2:
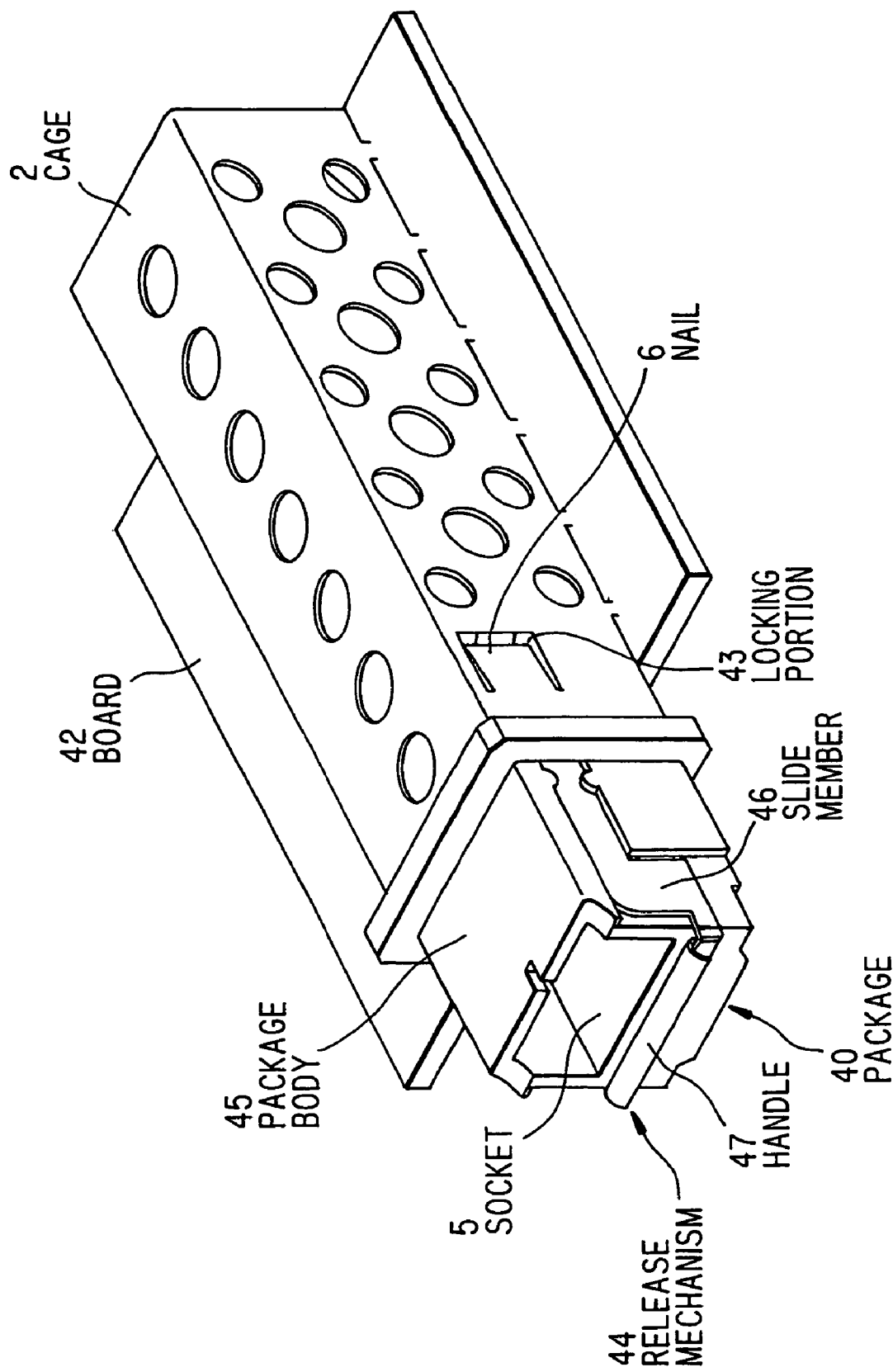
FIG. 2 is a perspective view showing the conventional optical communication package 40 in state of being locked in the cage 2.
Figure 3:
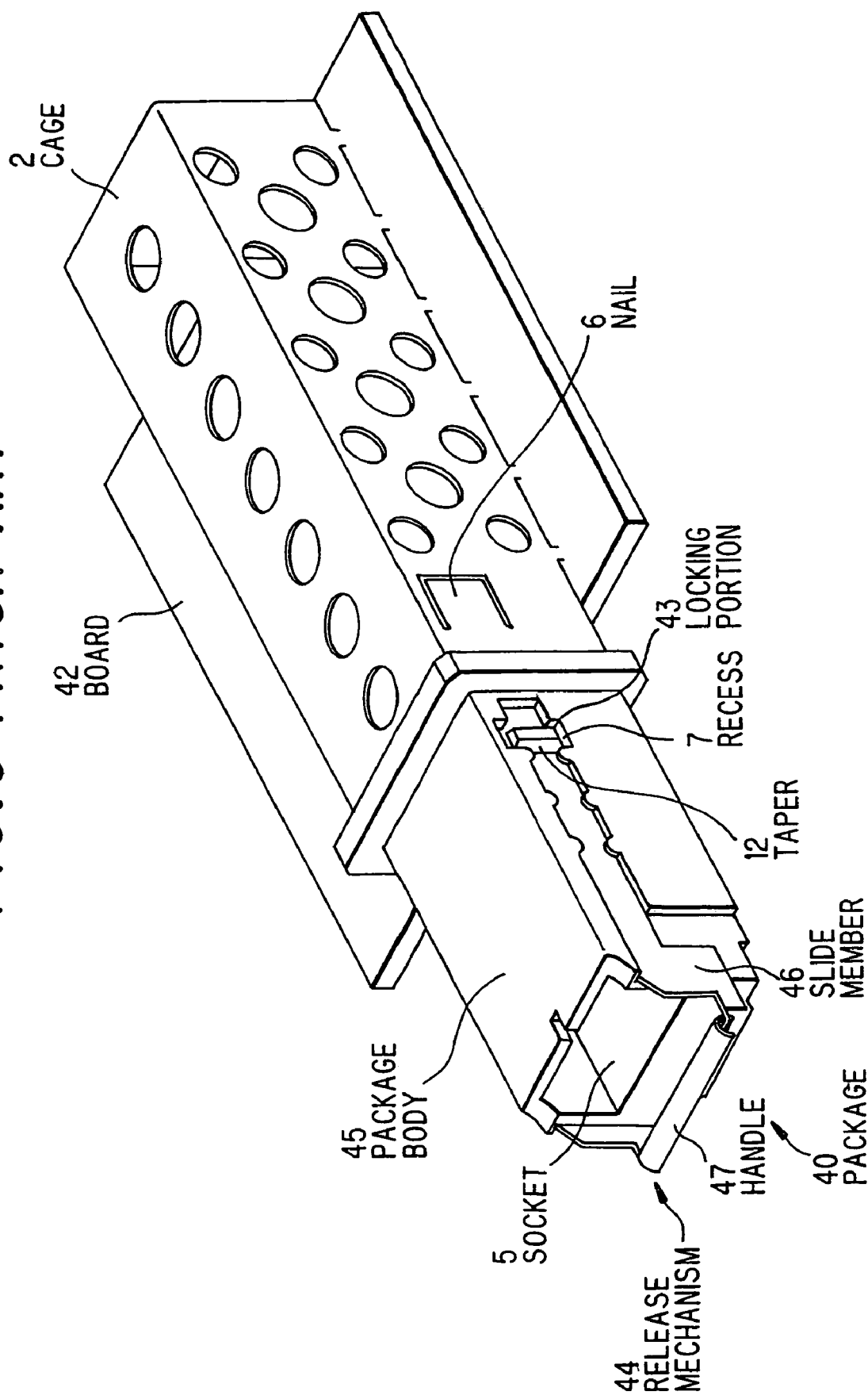
FIG. 3 is a perspective view showing the conventional optical communication package 40 in state of being extracted from the cage 2.
Figure 4:
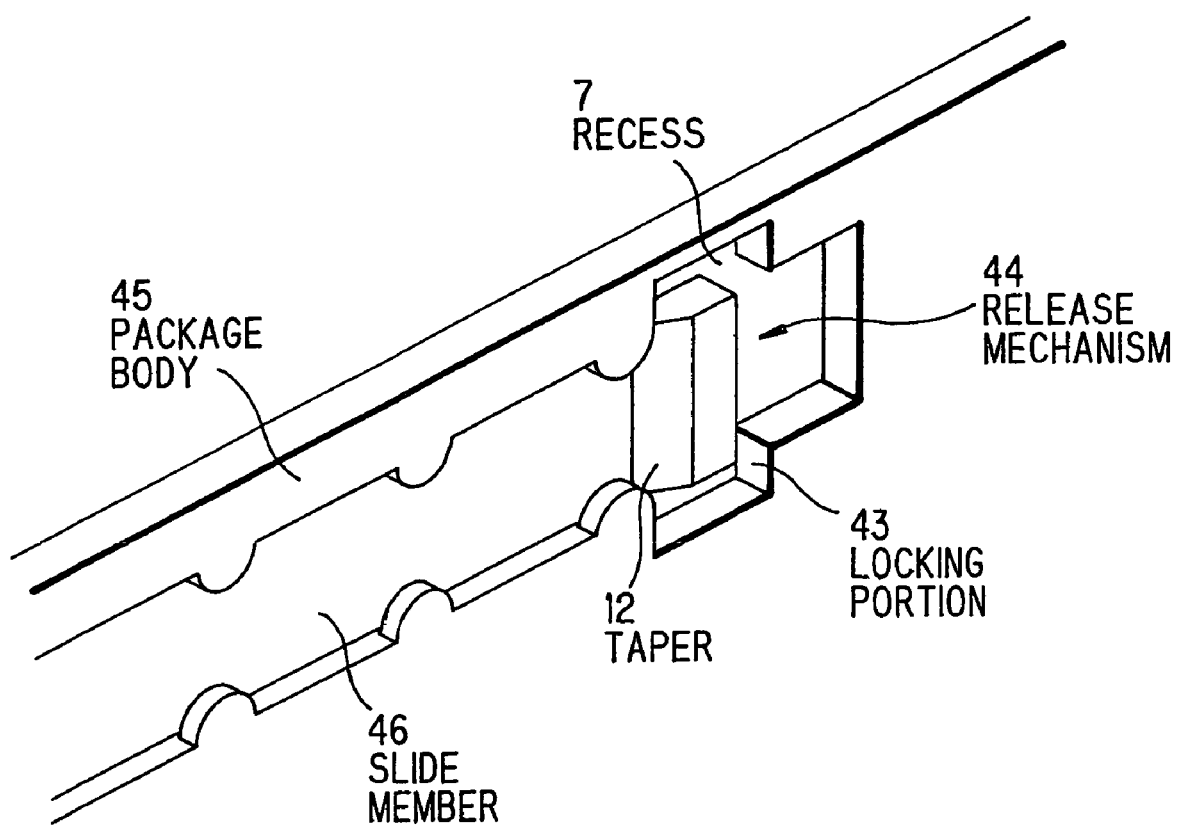
FIG. 4 is an enlarged perspective view showing part of the package 40 in FIG. 3.
Figure 5:
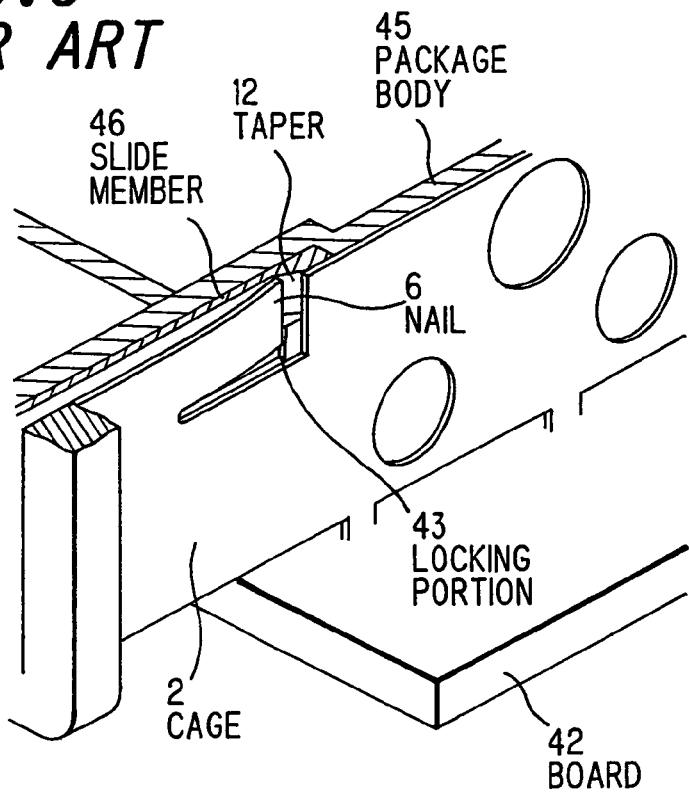
FIG. 5 is an enlarged partially sectioned perspective view showing the locking portion 43 of the package 40 in state of being locked by the nail 6 of the cage 2.
Figure 6:
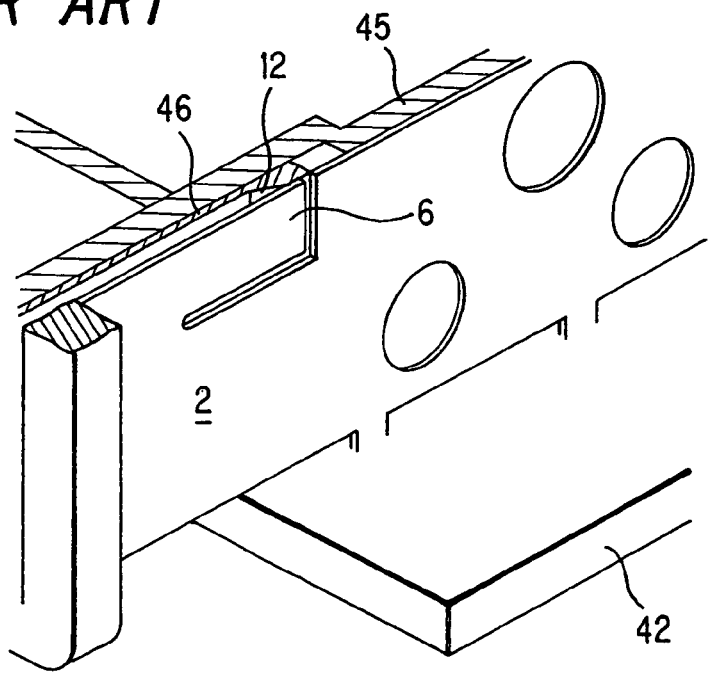
FIG. 6 is an enlarged partially sectioned perspective view showing the locking portion 43 in state of being unlocked from the nail 6.
Figure 7:
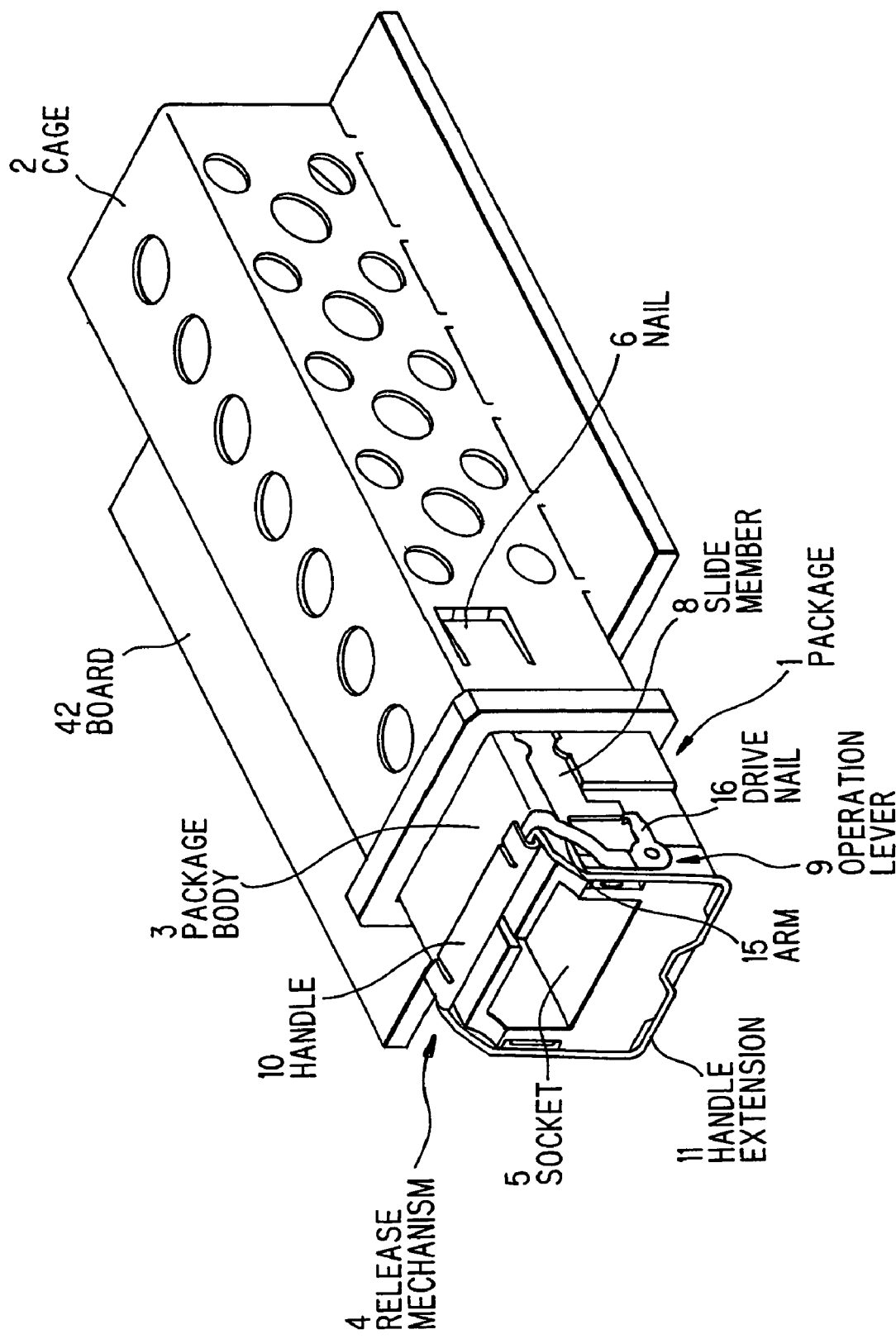
FIG. 7 is a perspective view showing a package 1 with lock mechanism of the first preferred embodiment of the invention in state of being locked in a cage 2.
Figure 8:
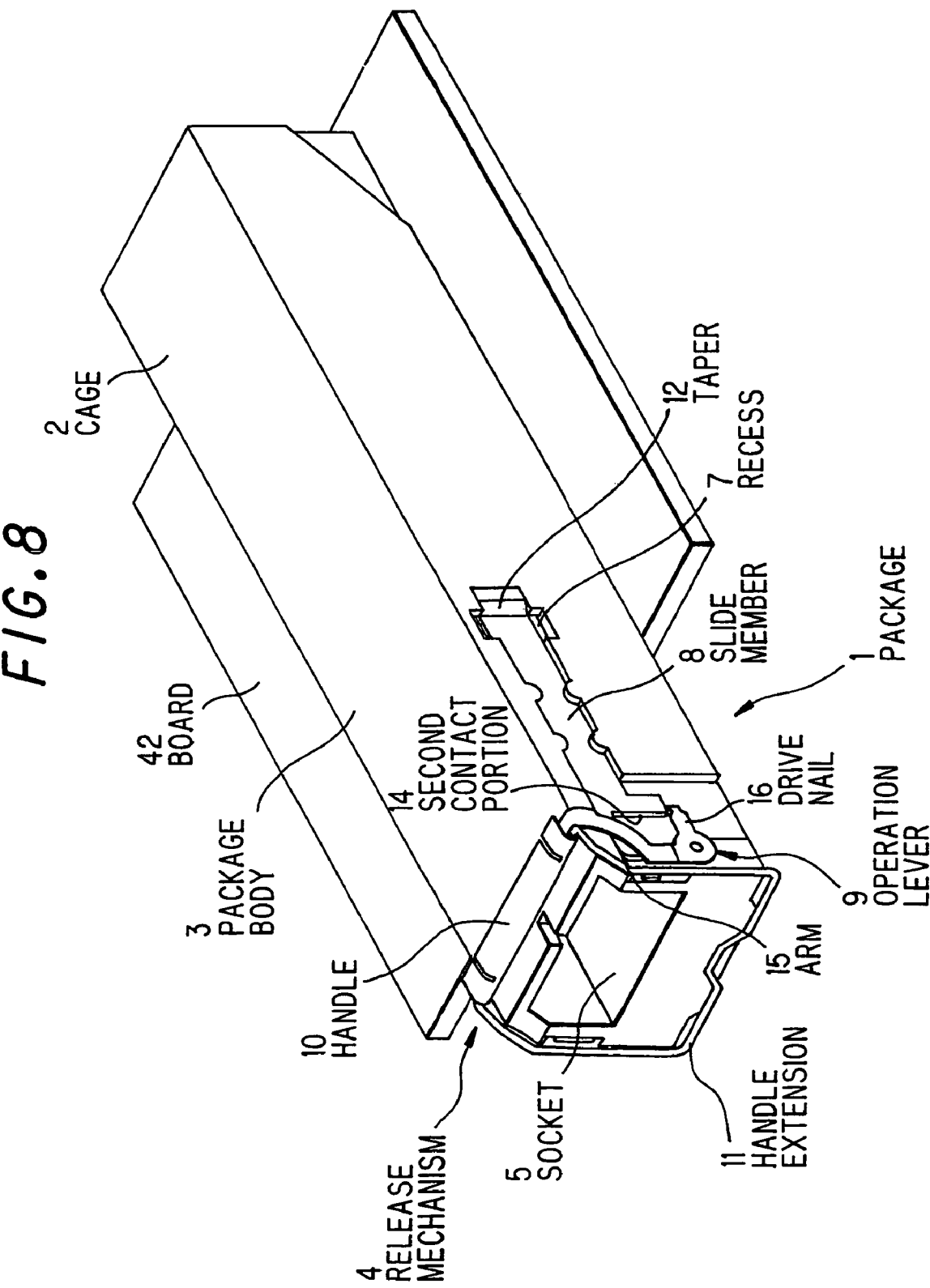
FIG. 8 is a perspective view showing the package 1 while seeing through the cage 2 in FIG. 7.

As shown in FIGS. 7 and 8, the package 1 with lock mechanism is composed of: a package body 3 that is detachably inserted into the cage 2 and releasably locked in the cage 2; and a release mechanism 4 to release the locking of cage 2 and package body 3.

The package body 3 is shaped like a long rectangular solid (box) extended backward and forward in the insertion/extraction direction and has a socket 5 at one end (front end) in the extraction direction to detachably receive an optical fiber connector (not shown). The package body 3 has recesses 7 formed on its both sides to receive and engage the nail 6 of cage 2.

The release mechanism 4 is composed of: a slide member 8 that is slidably attached to the package body 3 to release the locking of cage 2 and package body 3 by sliding it to a predetermined position; an operation lever 9 that is rotatably attached to the package body 3 to slide the slide member 8 to a predetermined position while engaging the slide member 8; and a handle extension 11 that is attached to a handle 10 of the operation lever 9 to extend the handle 10.

The slide member 8 is of strip-shaped plate member extending backward and forward, and it is attached slidably in the insertion/extraction direction to the both sides of package body 3 to cross the recess 7. The slide member 8 has a taper 12 on its back end to push out the nail 6 being engaged in the recess 7. With the taper 12 being slid inside the recess 7 from the backward of recess 7, the nail 6 is put out of the recess 7 in the device width direction. Also, the slide member 8 has contact portions 13, 14 to receive the rotation force of operation lever 9 while being engaged with the operation lever 9 and thus serves as a driven part to be driven by the operation lever 9 (operation unit).

The operation lever 9 is composed of: a pair of arms 15 that are, rotatably around a shaft, attached on the front-end both sides of package body 3; the handle 10 that is bridged between the arms 15; and a pair of drive nails 16 that extend in the radial direction from the rotation center to push the contact portions 13, 14 of slide member 8.

The arm 15 is disposed outside in the device width direction from the slide member 8 so as not to interfere with the slide member 8. Also, the arm 15 has such a predetermined length that the handle 10 is located on the package body 3 in state of being raised up and is extended in front of the package body 3 when the rotation front end is moved forward.

Figure 14:
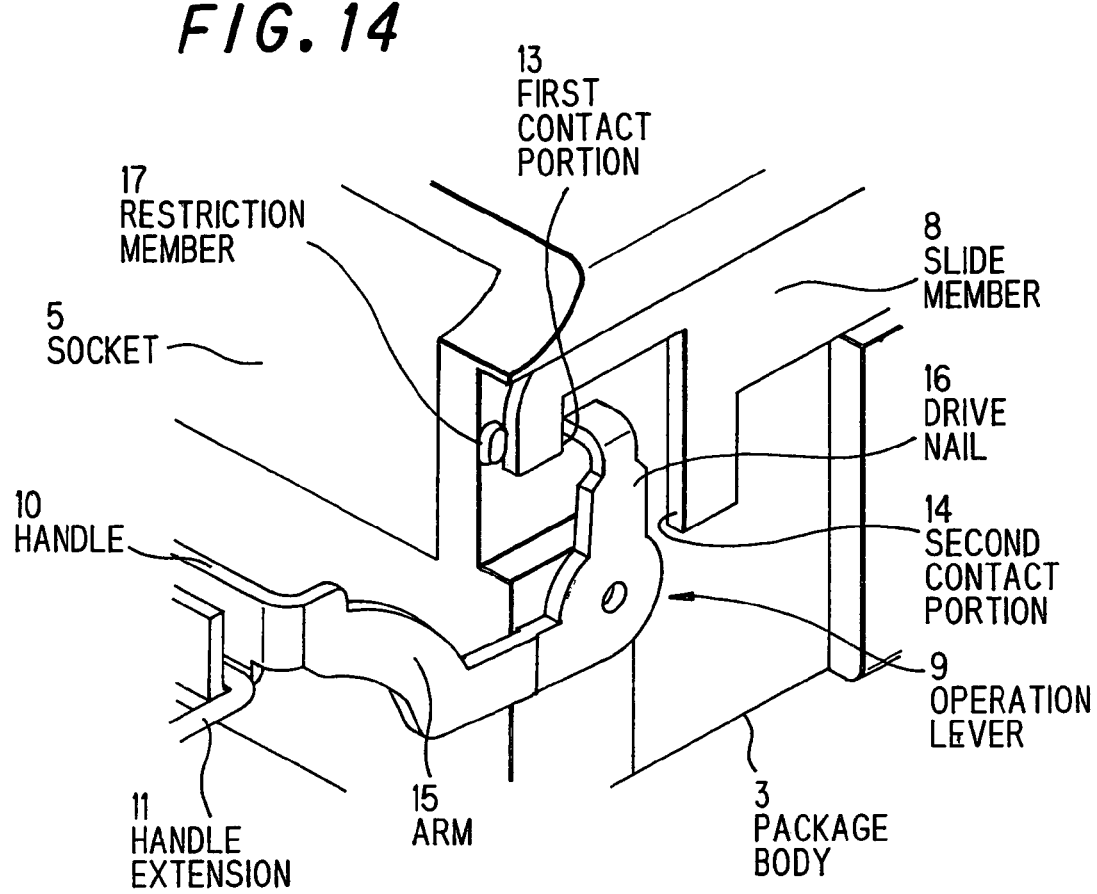
FIG. 14 is a partial enlarged view showing a release mechanism 4 and its vicinity in FIG. 11.

As shown in FIGS. 8 and 14, the drive nail 16 is bent inside in the device width direction such that the rotation front end interferes with the contact portions 13, 14 of slide member 8. The contact portion is composed of the first contact portion 13 that contacts the drive nail 16 when rotating the operation lever 9 forward and the second contact portion 14 that contacts the drive nail 16 when rotating the operation lever 9 backward. In detail, the first contact portion 13 and second contact portion 14 are disposed opposite to each other while sandwiching backward and forward the rotation front end of drive nail 16 and are formed as a side extending in the vertical direction. The first contact portion 13 and second contact portion 14 are disposed forward and backward distant from each other such that one contacts the drive nail 16 when the other is distant from the drive nail 16. An allowance (space) is provided between the operation lever 9 and slide member 8 such that the operation lever 9 turns over independently of the slide member 8 in its initial movement.

The operation lever 9 is configured such that it turns to the extraction direction when the slide member 8 is slid to a position that allows the nail 6 of cage 2 to be put out of the recess 7.

Figure 15:
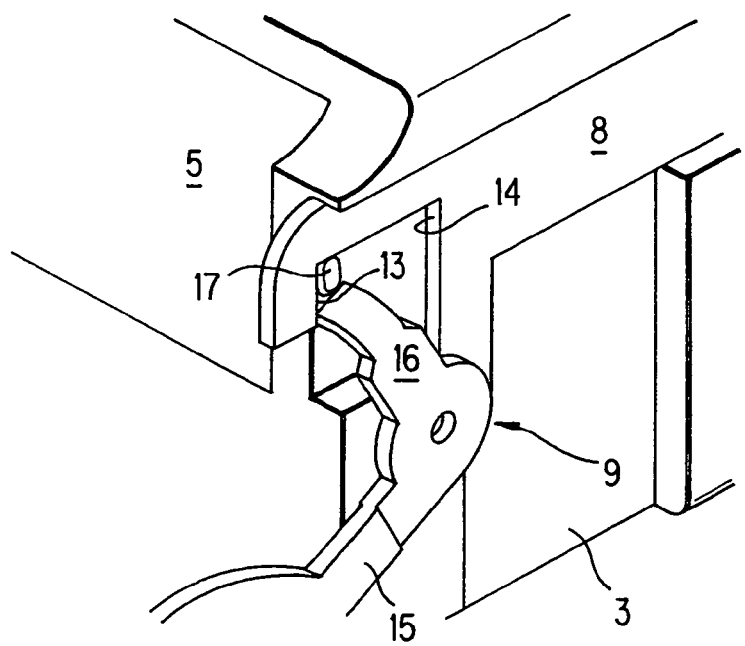
FIG. 15 is a partial enlarged view showing the operation lever 9 in state of being rotated exceeding the restriction of a restriction member 17.

Meanwhile, due to employing the release mechanism 4 of lever operation type, the release mechanism 4 including operation lever 9 may be broken or difficult to release from the cage 2 when the operation lever 9 is rotated exceeding its range of movement. In preparation for this, as shown in FIGS. 14 and 15, a restriction member 17 that controls the rotation of operation lever 9 to stop at a predetermined position and allows the rotation of operation lever 9 when excessive force is input from the operation lever 9 is attached to the package body 3.

The restriction member 17 of this embodiment is a projection, as stopper, provided on the slide path of slide member 8 and is, in normal position, located in front of the slide member 8. The restriction member 17 is shaped such that it indirectly restricts the rotation of operation lever 9 by restricting the forward slide of slide member 8 and that it allows the slide member 8 to climb over the projection while bending when the slide member 8 is slid forward by excessive force due to rapid lever operation etc.

The release mechanism 4 is configured such that the operation lever 9 is separated from the slide member 8 when the restriction member 17 allows the rotation of operation lever 9 (i.e., when the operation lever 9 is rotated beyond the restriction range of restriction member 17). In detail, the positional relationship between the first contact portion 13 and drive nail 16 is determined such that the drive nail 16 turns over departing from the first contact portion 13 when the operation lever 9 is rotated to a predetermined position (a position where the slide member 8 climbs over the restriction member 17).

Figure 9:
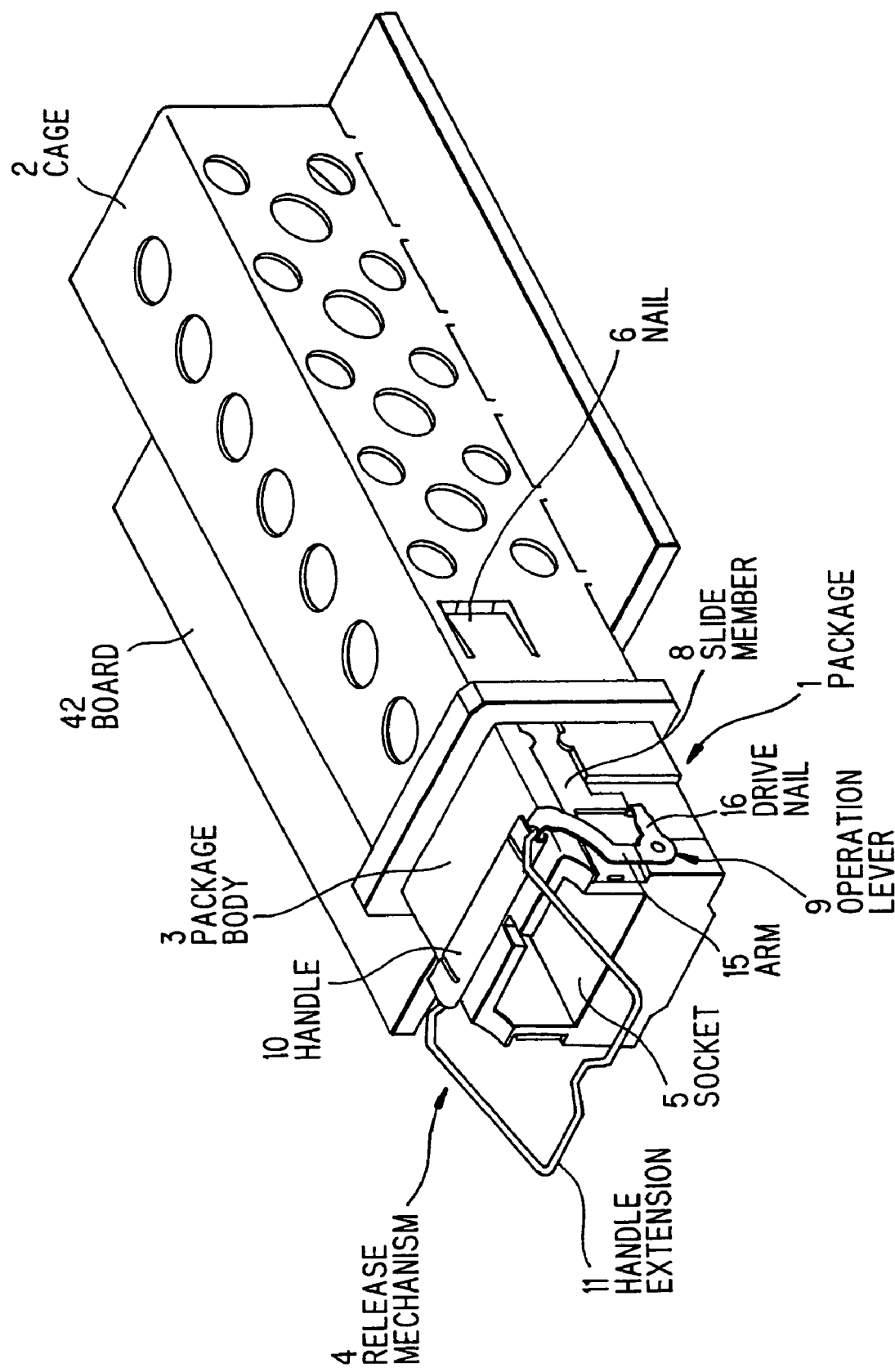
FIG. 9 is a perspective view showing the package 1 with a handle extension 11 being rotated upward.

As shown in FIGS. 7 and 9, the handle extension 11 is of a wire-like metallic member with less weight and thinner diameter than arm 15 and is rotatably attached to the handle 10. The handle extension 11 has a shape of rectangular frame such that it lies along the front-end circumference of package body 3 while being folded in the front of operation lever 9 and extending downward from the handle 10 when the operation lever 9 is raised up along the front-end of package body 3.

Figure 17:
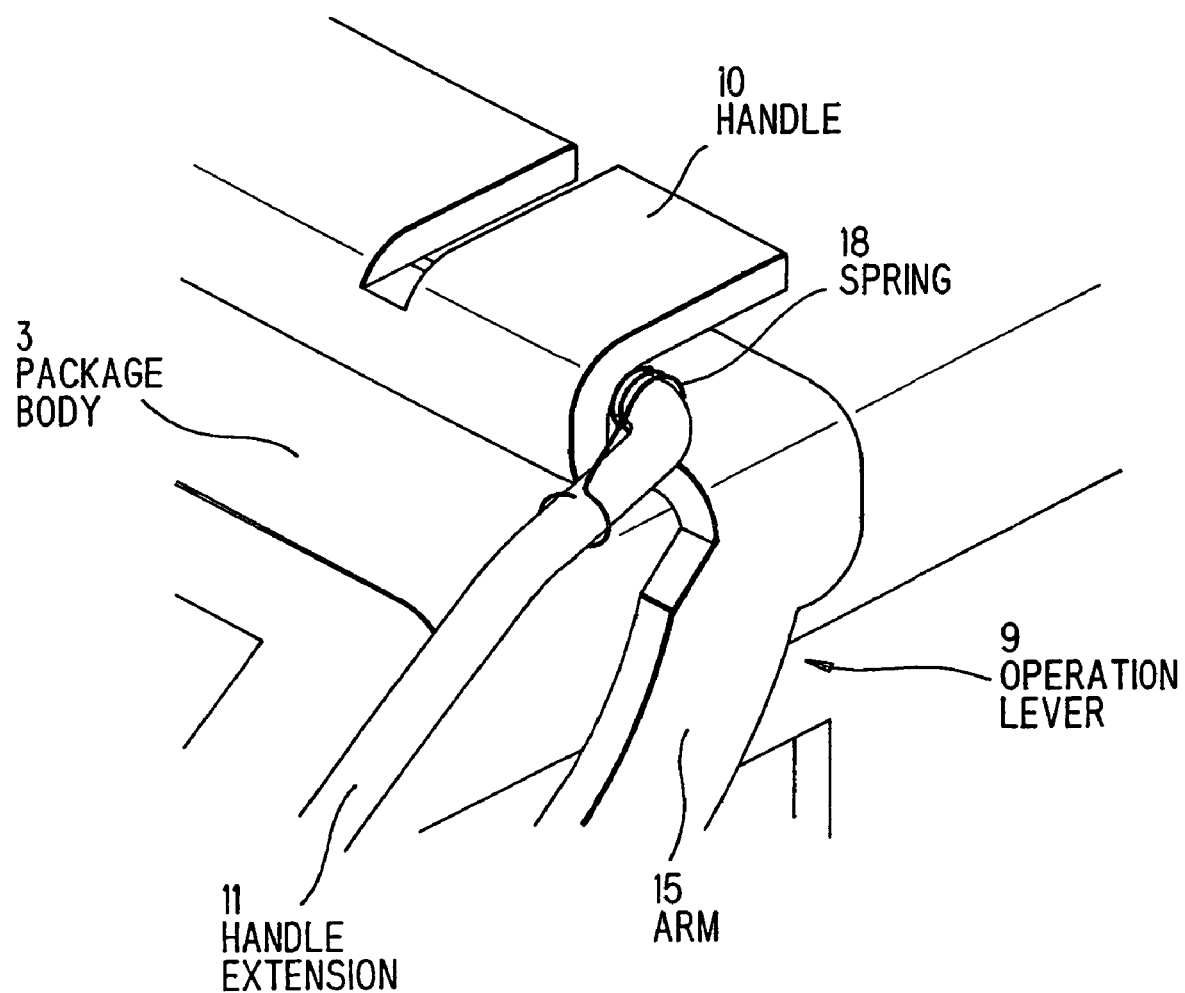
FIG. 17 is a partial enlarged view showing the package 1 in FIG. 7.

As shown in FIG. 17, a spring 18 is provided between the handle 10 and handle extension 11 such that it energizes the handle extension 11 to be folded. It keeps folding the handle extension 11 when the operation lever 9 is operated by directly holding the handle 10 or when the operation lever 9 is not operated. For example, the spring 18 is of a coil spring wounded around the handle extension 11, and its one end is attached to the handle 10 and the other end is attached to the handle extension 11. The spring 18 has such a minimum springy force that is required to fold the handle extension 11.

The functions of package 1 in this embodiment will be described below.

Figure 16A:
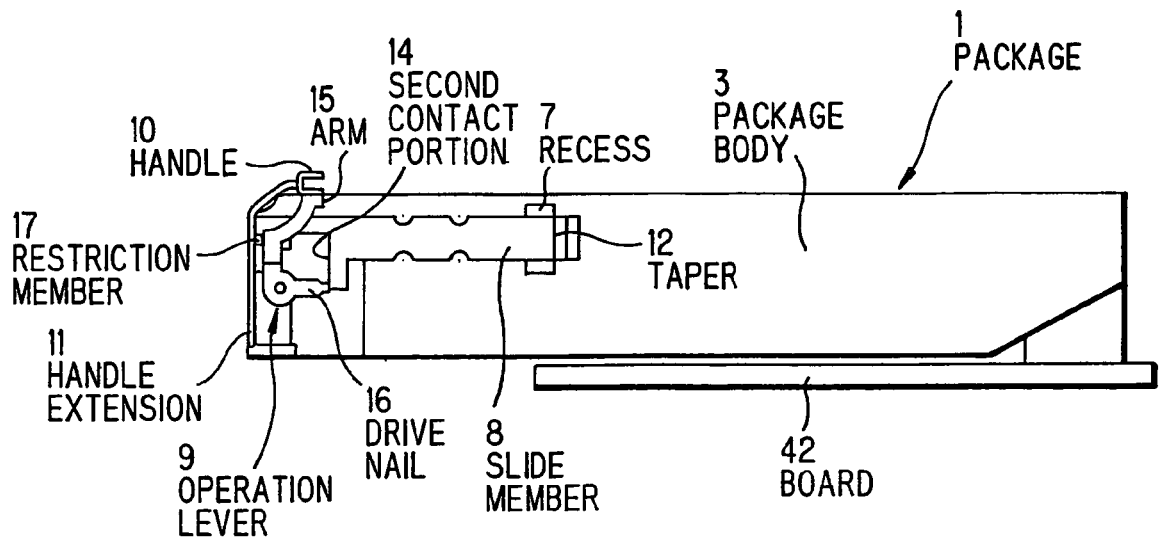
FIG. 16A is a side view showing the package 1 in state of being locked.

As shown in FIGS. 7 and 16A, easier one of the handle 10 and handle extension 11 to hold with finger is pulled forward when extracting the package 1 being locked by the cage 2 from the cage 2.

Figure 16B:
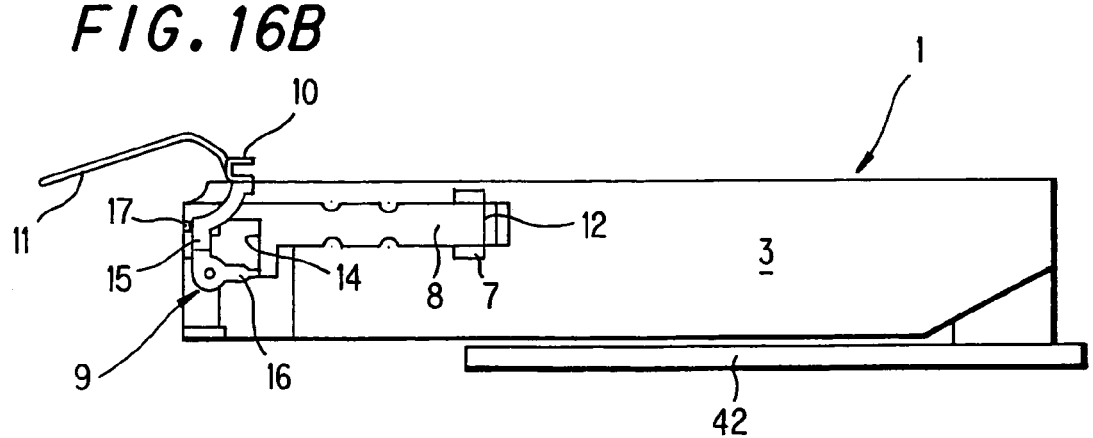
FIG. 16B is a side view showing the package 1 with the handle extension 11 being rotated in state of being locked.

As shown in FIGS. 9 and 16B, in pulling the handle extension 11, the handle extension 11 is rotated forward around the handle 10 of operation lever 9 until being nearly horizontally extended Since the rotation resistance of handle extension 11 is only the weak spring 18 and the handle extension 11 has a sufficiently reduced weight, the handle extension 11 is easy to draw.

After the handle extension 11 is extended forward, nothing interferes with the operation of handle extension 11. Then, the handle extension 11 is held further securely with finger.

Figure 10:
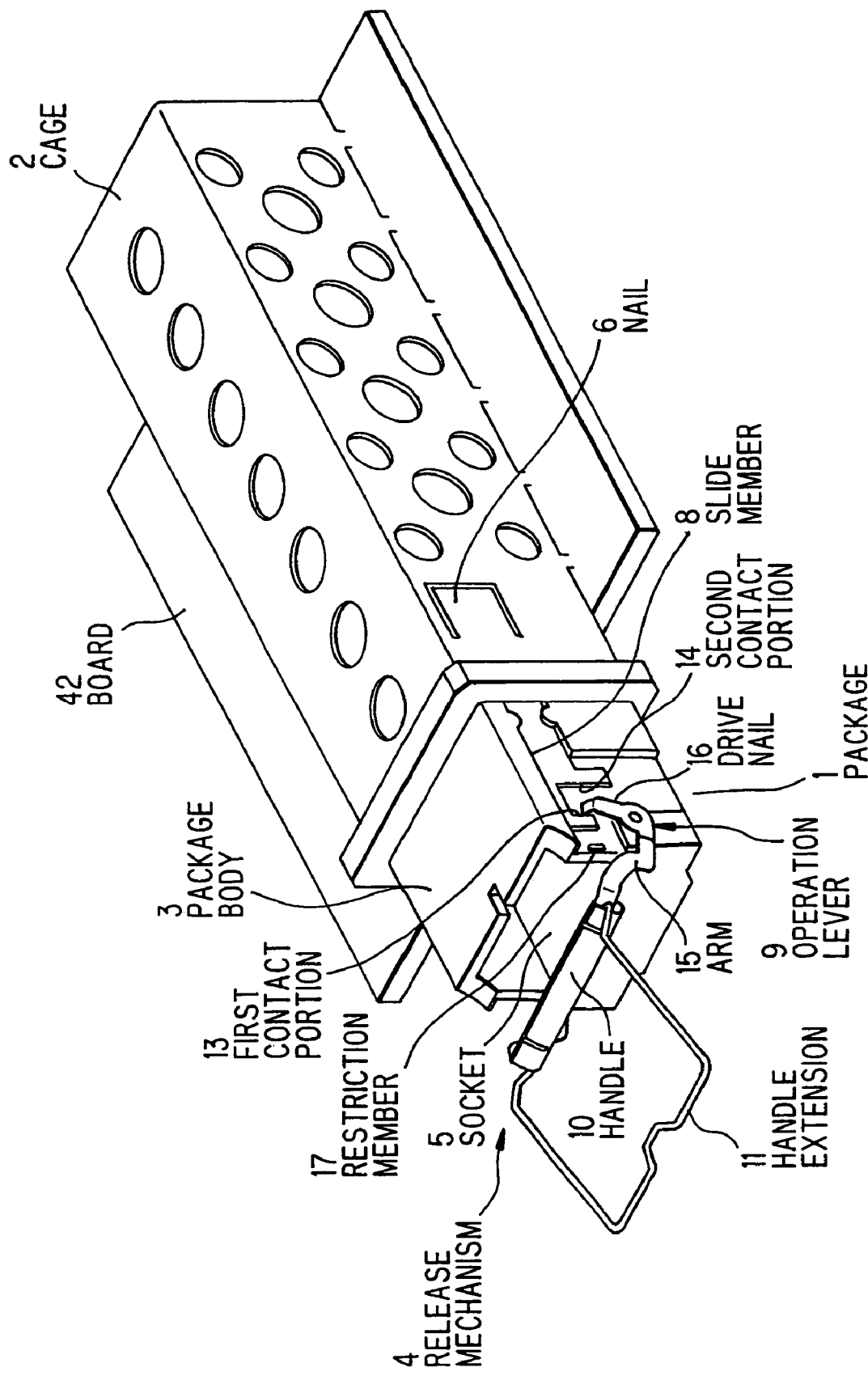
FIG. 10 is a perspective view showing the package 1 with an operation lever 9 being rotated forward.
Figure 11:
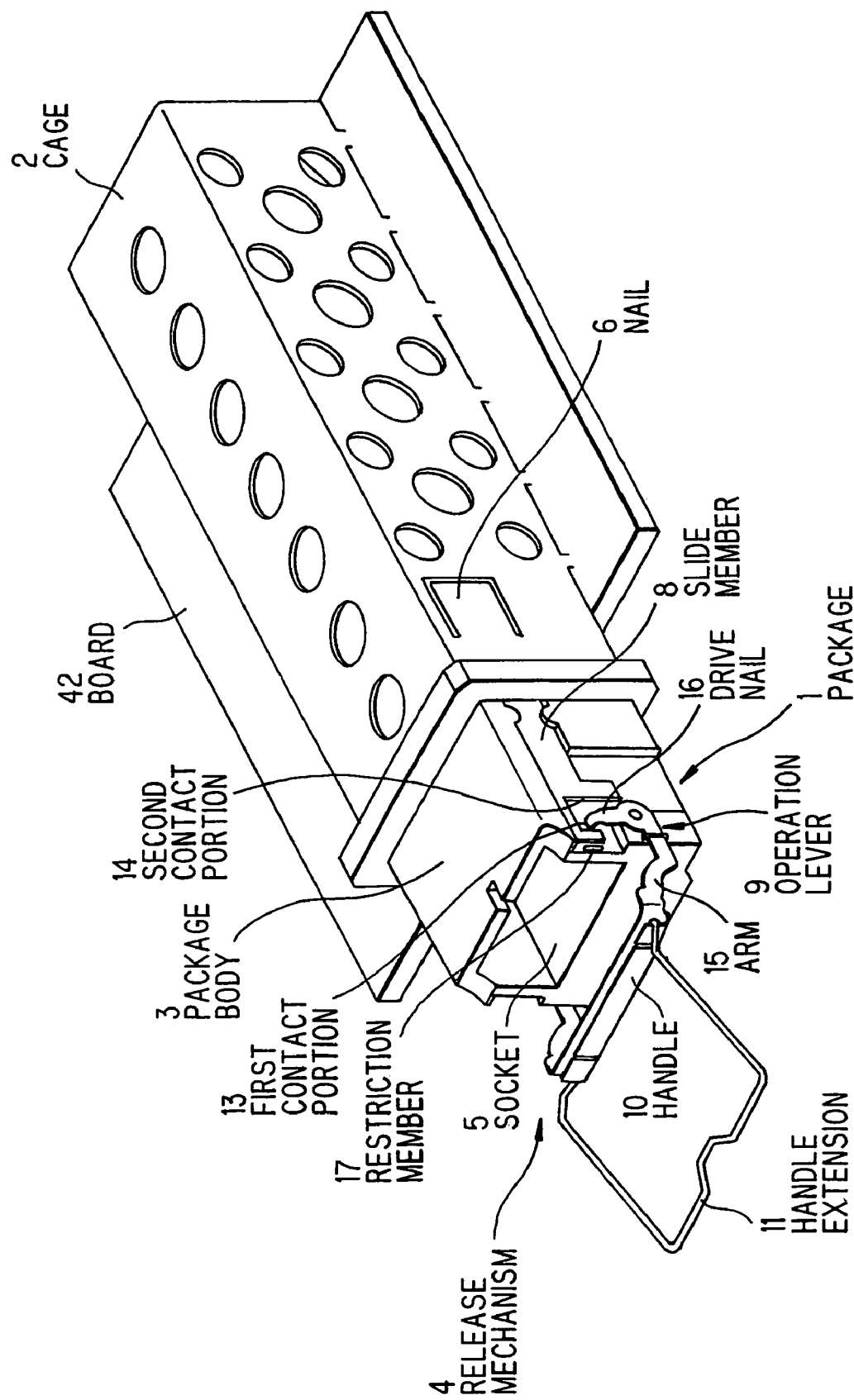
FIG. 11 is a perspective view showing the package 1 with the operation lever 9 being further rotated forward.
Figure 16C:
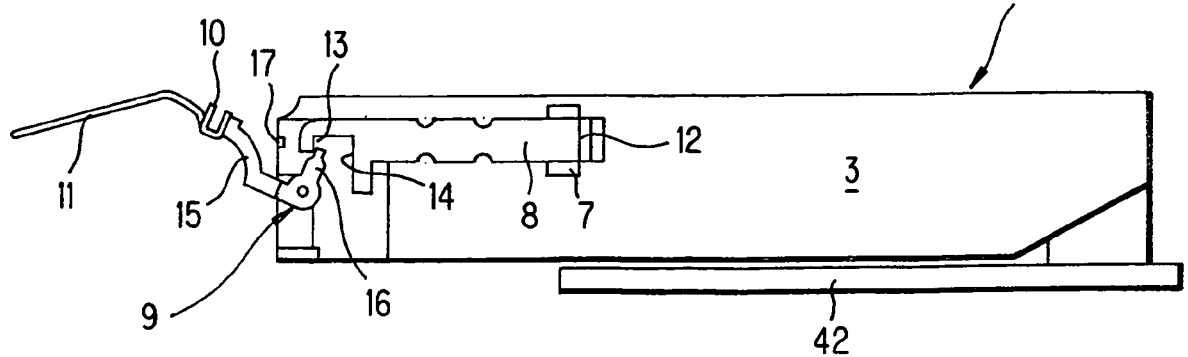
FIG. 16C is a side view showing the package 1 with the operation lever 9 being rotated in state of being locked.

Then, as shown in FIGS. 10 and 16C, when the handle extension 11 is further pulled, the handle 10 connecting with the handle extension 11 is drawn forward and the operation lever 9 is thereby rotated forward. When the operation lever 9 thus starts rotating from the raised-up position, the drive nail 16 is sufficiently distant from the first contact portion 13. Therefore, the drive nail 16 does not push the first contact portion 13 until the operation lever 9 is rotated by a predetermined angle, and the operation lever 9 turns over during that time.

Then, when the operation lever 9 is rotated to some degree, the handle extension 11 is pulled downward while reducing the pull force gradually. As the drive nail 16 starts pushing the first contact portion 13, the slide member 8 starts sliding forward. However, since the operation lever 9 serves to restrict the forward movement of package body 3 due to the pressing-down operation of handle extension 11, the package body 3 is not extracted from the cage 2 together with the slide member 8. Therefore, malfunction such as catching in cage 2 does not occur even when the release of locking, described later, is not performed simultaneously on both sides.

Figure 12:
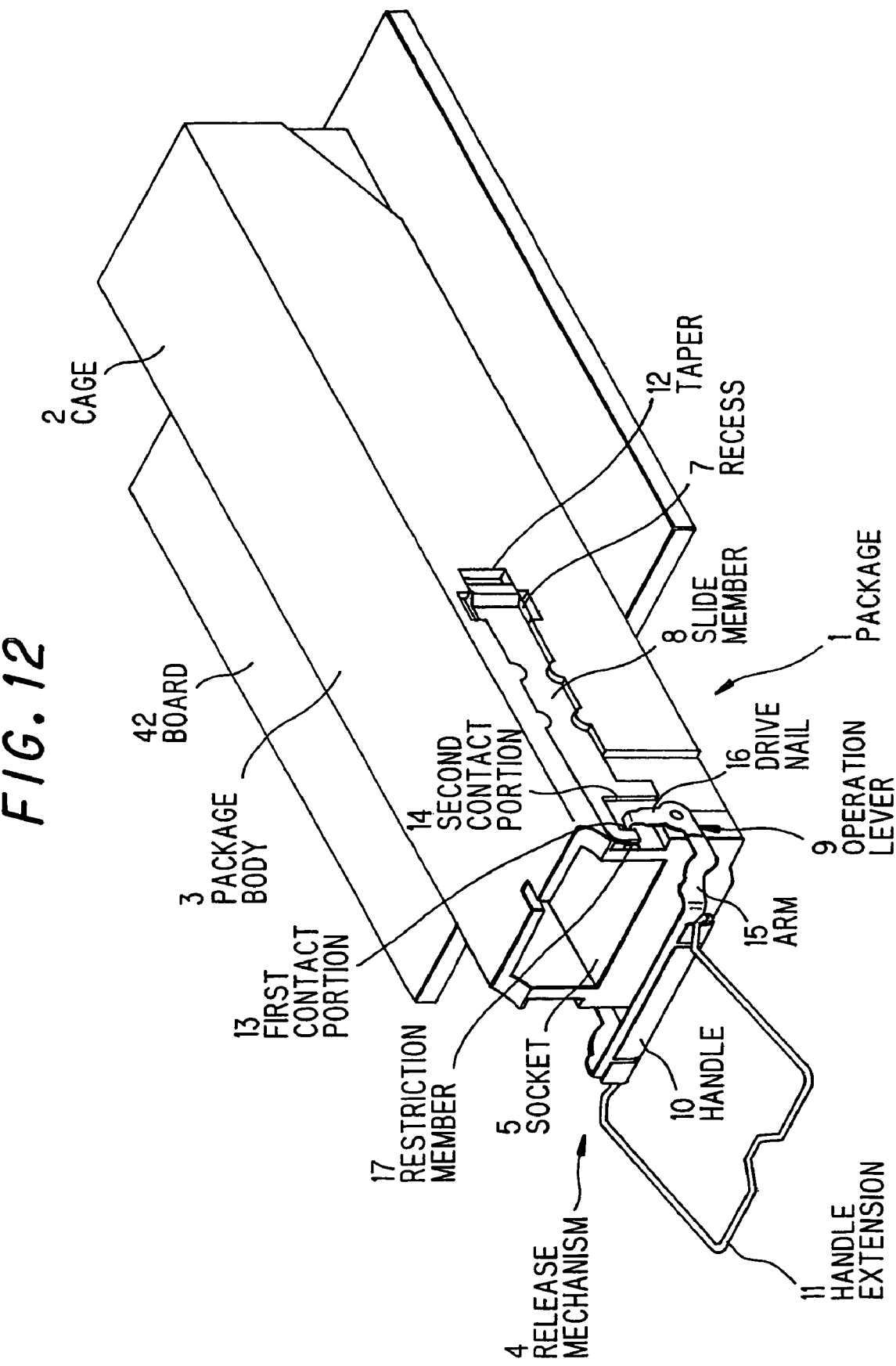
FIG. 12 is a perspective view showing the package 1 while seeing through the cage 2 in FIG. 11.
Figure 16D:
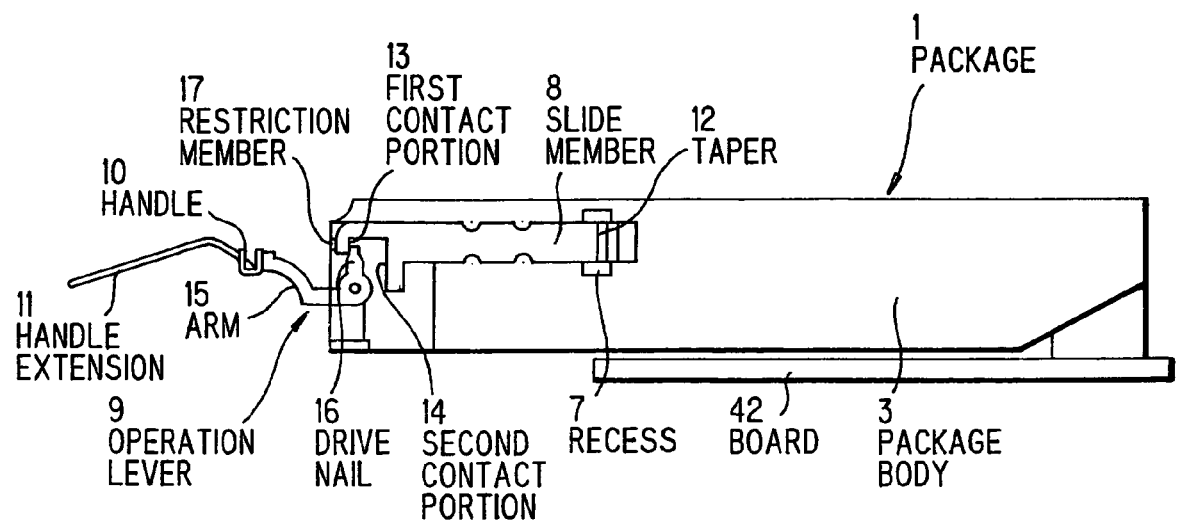
FIG. 16D is a side view showing the package 1 with the operation lever 9 being further rotated in state of being released from the locking.

Then, as shown in FIG. 12, while the slide member 8 is slid forward, the taper 12 is entered into the recess 7 and the end of nail 6 engaging the recess 7 is pushed out in the device width direction. After the nail 6 is completely put out of the recess 7, as shown in FIGS. 9 and 16D, the slide member 8 contacts the restriction member 17 and the slide thereof is restricted.

Figure 13:
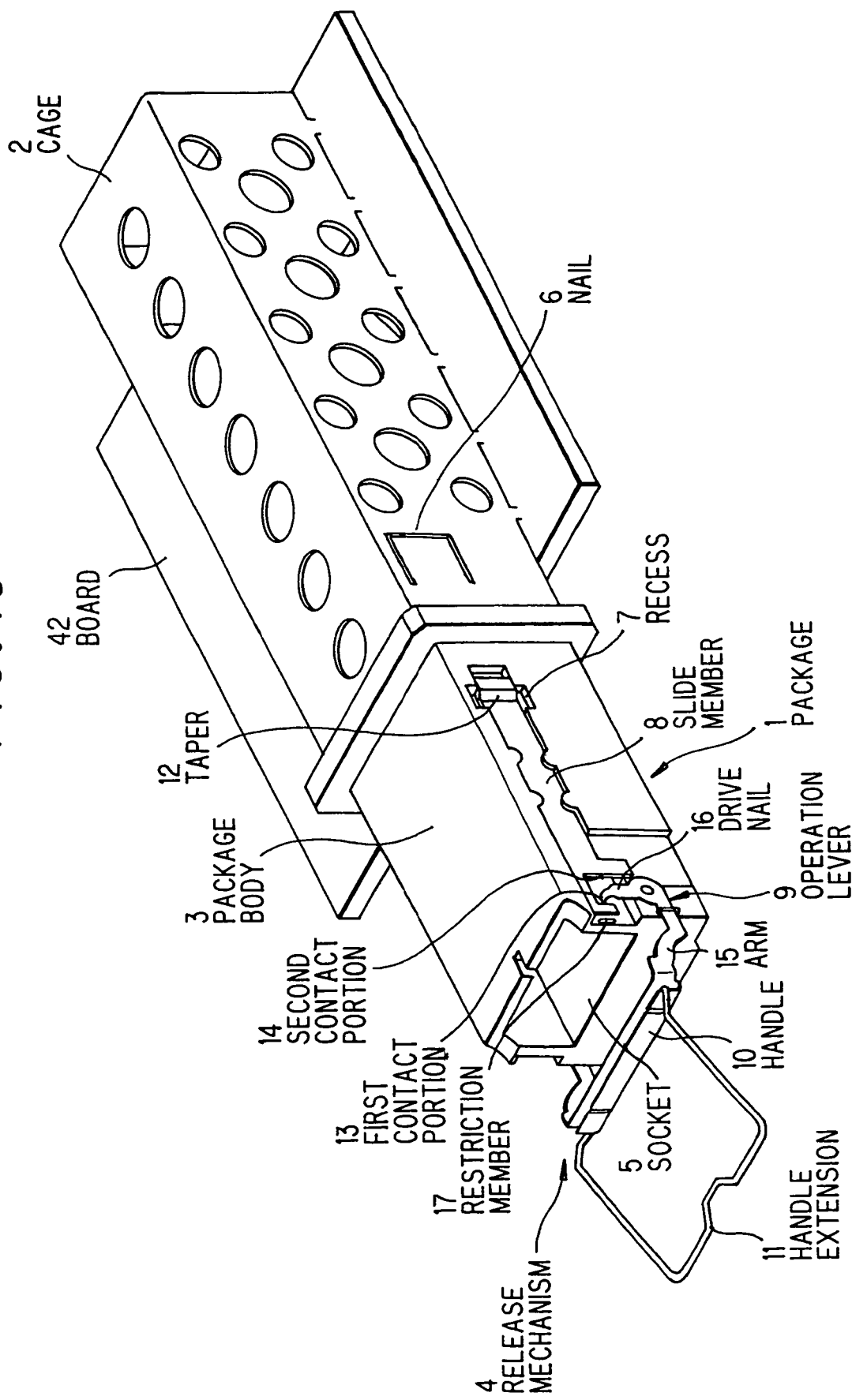
FIG. 13 is a perspective view showing the package 1 in state of being extracted from the cage 2.

Thereby, the downward movement of handle extension 11 is also restricted. Then, stopping the pressing-down operation, the handle extension 11 is pulled forward. Since the locking of cage 2 and package body 3 is released when the nail 6 is completely put out of the recess 7, the package 1 can be easily taken out from the cage 2 as shown in FIG. 13.

On the other hand, in case of pulling directly the handle 10 of operation lever 9, the operation lever 9 is rotated forward but, as described earlier, turns over without applying force to the slide member 8 in its initial movement. Therefore, the operation lever 9 can be easily pulled out while rotating even when the operation lever 9 is held weakly with finger. Since the handle extension 11 is kept folded, it does not interfere with that operation.

After the operation lever 9 is pulled out, the operation lever 9 is rotated until the rotation is restricted by the restriction member 17 as in the case of operating the handle extension 11. Then, by pulling the operation lever 9, the package body 3 can be easily and surely taken out from the cage 2.

Figure 16E:
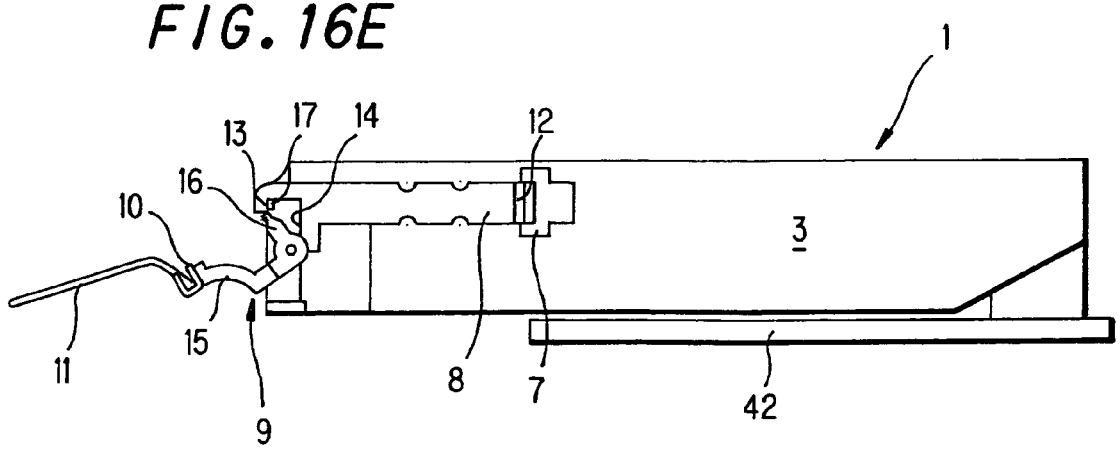
FIG. 16E is a side view showing the package 1 with the operation lever 9 being rotated exceeding the restriction of the restriction member 17.

Even if the operation lever 9 is rotated being applied with excessive force due to operation error etc., the force is removed because the slide member 8 climbs over the restriction member 17 as shown in FIGS. 15 and 16E. Thus, the operation lever 9 and slide member 8 does not damage. Further, when the slide member 8 climbs over the restriction member 17, the drive nail 16 disengages from the first contact portion 13 and the operation lever 9 is thereby separated from the slide member 8. This can surely prevent the damage of operation lever 9 and slide member 8. Therefore, a difficulty in extracting the package 1 from the cage 2 due to such damage does not occur.

As described above, since the package body 3 is equipped with the rotatable operation lever 9 that engages the slide member 8 to slide the slide member 8 until a predetermined position, the locking release operation (fold-down operation of operation lever 9) can be completely separated from the package body 3 extraction operation (pull-out operation of operation lever 9). Thus, the package 1 can be taken out from the cage 2 while preventing malfunction in the release of locking.

The operation lever 9 turns to the package body 3 extraction direction when it is rotated until the slide member 8 reaches a predetermined position. Therefore, the package 1 can be extracted from the cage 2 by directly pulling the operation lever 9 in state of being rotated to release the locking.

Since the restriction member 17 allows the rotation of operation lever 9 even when receiving an excessive force from the operation lever 9, it can prevent the damage of release mechanism 4 by removing an excessive force that may be applied to the operation lever 9. Thus, a difficulty in extracting the package 1 from the cage 2 due to such damage of the release mechanism 4 can be prevented.

Further, since the operation lever 9 can be separated from the release mechanism 4 when the restriction member 17 allows the rotation of operation lever 9, it can prevent the damage of the other components composing the release mechanism 4 by removing an excessive force that may be applied to the operation lever 9.

The release mechanism 4 has the allowance (space) provided between the operation lever 9 and slide member 8 such that the operation lever 9 turns over independently of the slide member 8 in its initial movement. Therefore, the operation lever 9 can be easily pulled out while rotating even when the operation lever 9 is held weakly with finger.

Further, since the handle extension 11 is provided extending the handle 10 to operate the release mechanism 4, the release of locking is easily performed by operating the handle extension 11 even when it is difficult to hold the operation lever 9 (or handle 10). Thus, the package 1 can be taken out from the cage 2.

The spring 18 is provided between the handle 10 and handle extension 11 such that it energizes the handle extension 11 to be folded. It keeps folding the handle extension 11 when the operation lever 9 is not operated. Thus, the handle extension 11 thus folded does not disturb the other operation.

The handle 10 is provided at free end of operation lever 9 rotatably attached to the package body 3 and the handle extension 11 is rotatably attached to the handle 10. Therefore, the handle extension 11 can be easily folded.

Although in this embodiment the handle extension 11 is of a wire-like metallic member, it is not limited to that material. For example, the handle extension 11 may be a cable such as chain and cord. The handle extension 11 may be of the other material, such as resin, than metal if a sufficient strength can be secured.

Figure 18:
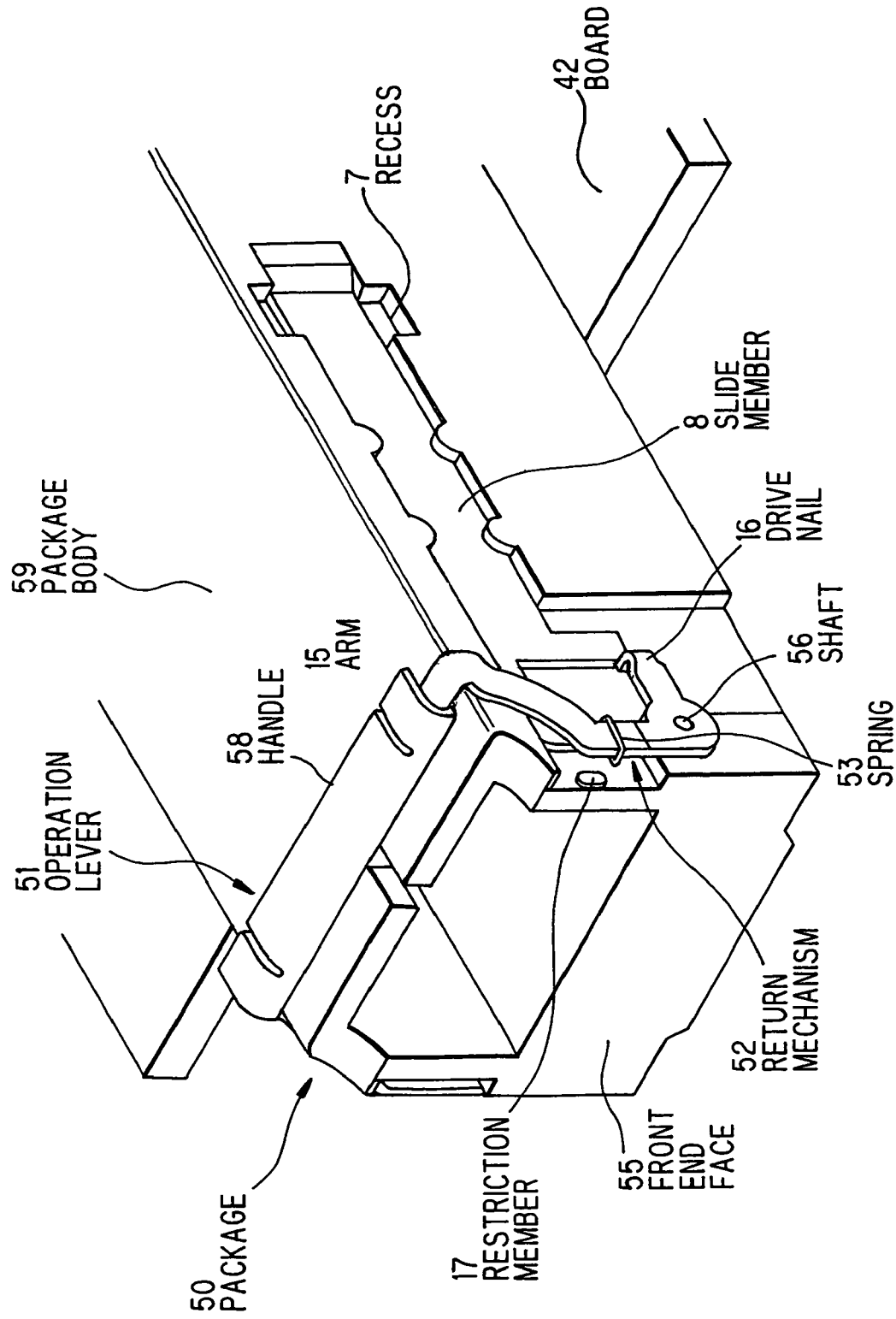
FIG. 18 is a partial perspective view showing a package 50 with lock mechanism in a second preferred embodiment of the invention.

FIG. 18 is a partial perspective view showing a package 50 with lock mechanism in the second preferred embodiment of the invention. In this embodiment, the package 50 is provided with a return mechanism 52 to automatically fold an operation lever 51. Like components are indicated same numerals used in the first embodiment and explanations thereof are omitted below.

Figure 19:
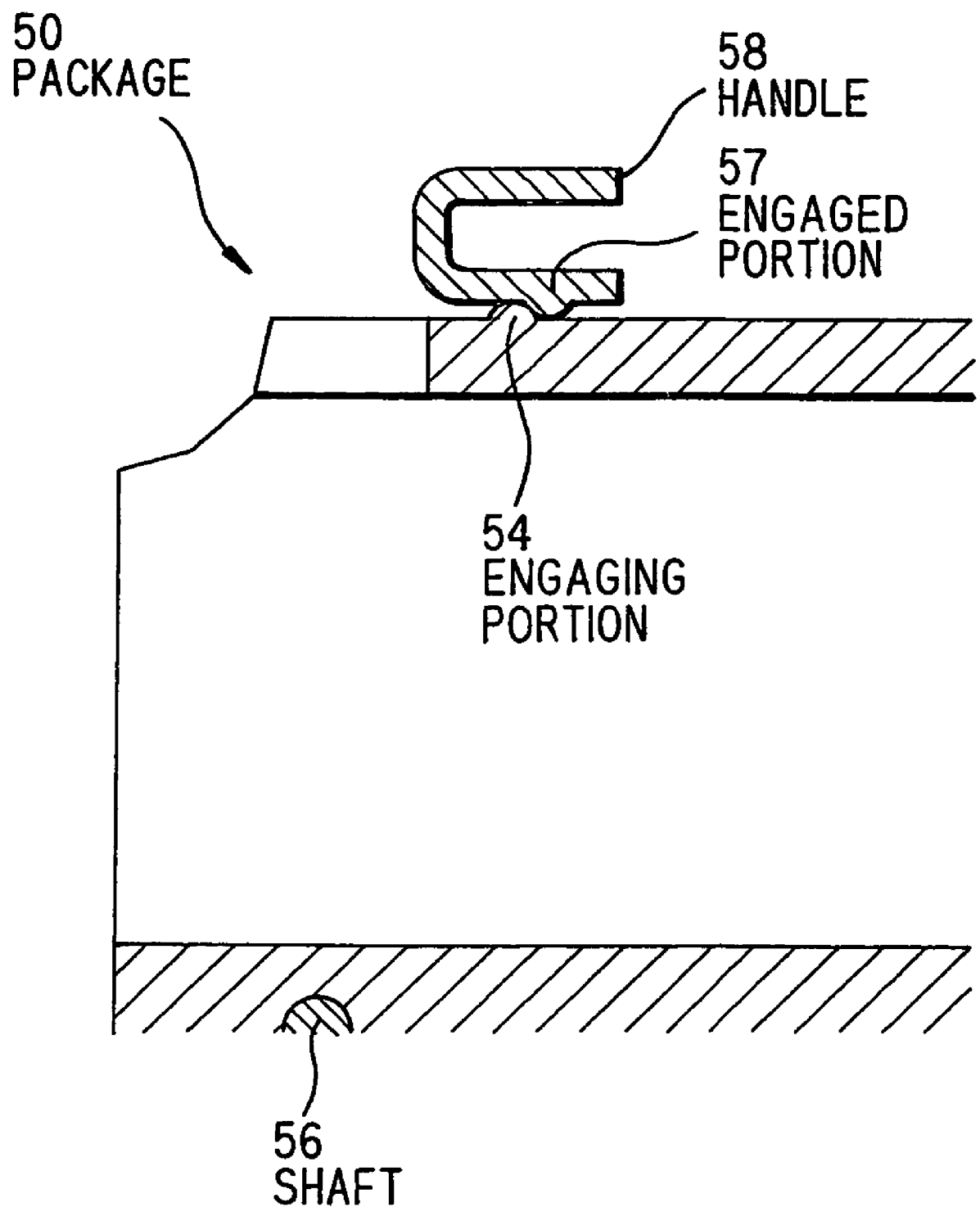
FIG. 19 is a partial cross sectional view showing the package 50 in FIG. 18.

As shown in FIGS. 18 and 19, the return mechanism 52 is composed of: a spring 53 that is provided between a package body 59 and the operation lever 51 to energize the operation lever 51 to rotate in the direction of package body 59; and an engaging portion 54 that is formed on the package body 59 to retain the operation lever 51 in state of being folded. The operation lever 51 has the same function as the operation lever 9 and is folded along a front-end face 55 of the package body 59 in state of being raised up and is extended in front of the package body 59 when the rotation front end is moved forward.

The spring 53 is a coil spring wounded around a shaft 56 of the operation lever 51, and its one end is attached to the package body 59 and the other end is attached to the operation lever 51. The spring 53 has such a minimum springy force that allows the operation lever 51 to be easily rotated with finger.

The engaging portion 54 is a projection formed on the package body 59. It allows the rotation of operation lever 51 while contacting the operation lever 51 when the operation lever 51 is rotated. The operation lever 51 is provided with an engaged portion 57 to well engage to the engaging portion 54. The engaged portion 57 is formed projecting outside of an handle 58 bridged between the arms 15 of operation lever 51, and it restricts the rotation of operation lever 51 by contacting the engaging portion 54 when the operation lever 51 is in state of raised up and folded on the package body 59.

The functions of package 50 in this embodiment will be described below.

Figure 20:
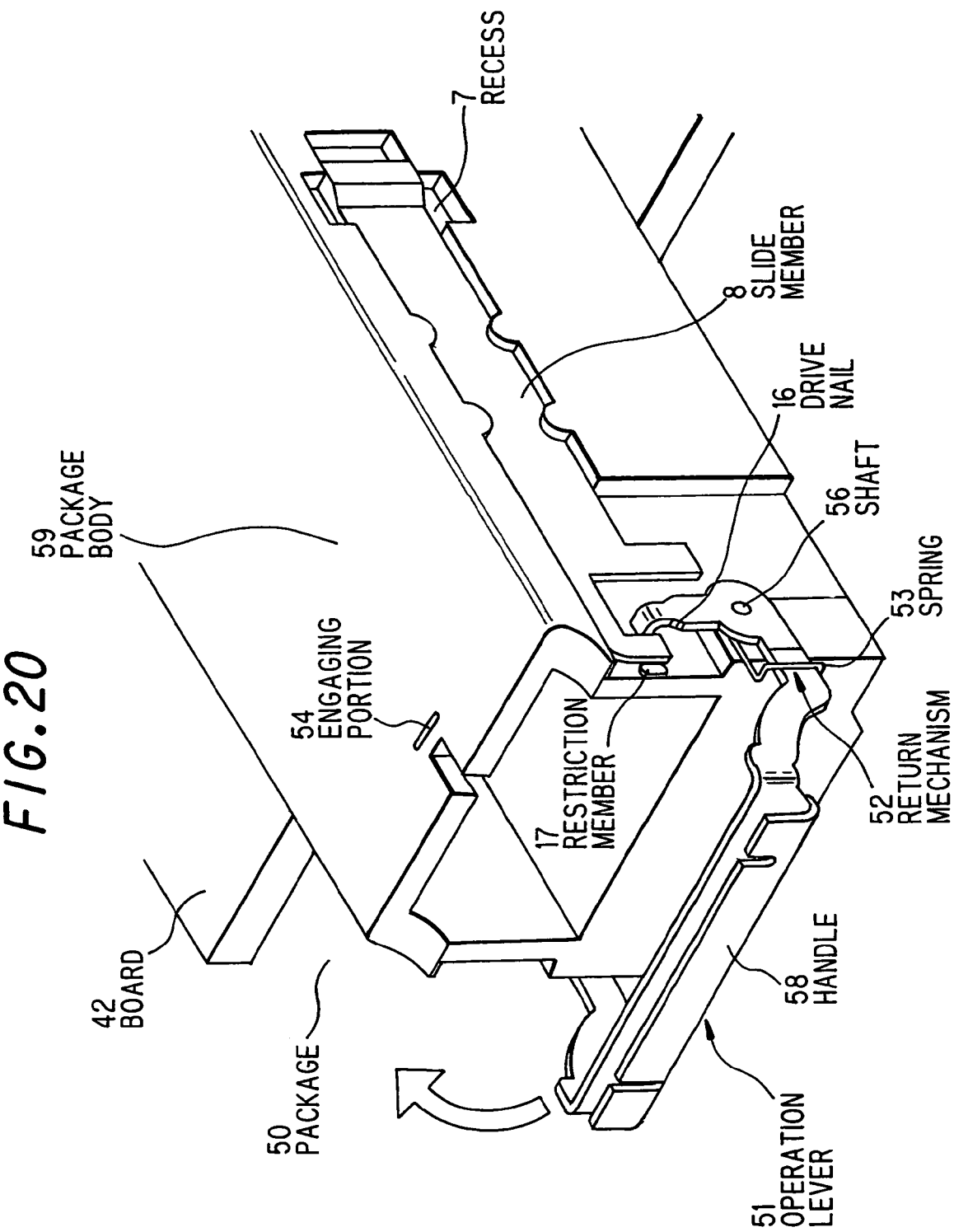
FIG. 20 is a partial perspective view showing the package 50 with an operation lever 51 being disengaged.

By pulling the operation lever 51 forward, the operation lever 51 starts rotating while allowing the engaged portion 57 to climb over the engaging portion 54. At that time, the operation lever 51 is subjected to a pull force from the spring 53 but the pull force does not disturb the operation of operation lever 51 since the springy force of spring 53 is set sufficiently weakly. Then, as shown in FIG. 20, by rotating the operation lever 51 until the rotation is restricted by the restriction member 17 and then pulling the operation lever 51 forward, the package 50 can be taken out from the cage (not shown).

In case of loading the package 50 into the cage, the package 50 is inserted into the cage while keeping the operation lever 51 folded. During this process, the operation lever 51 is restricted by the engaging portion 54 in its rotation direction as well as being energized by the spring 53 in the raised-up direction. Therefore, it does not fall forward in that process. Thus, the loading operation can be stably performed.

Since the spring 53 is provided between the package body 59 and operation lever 51 to energize the operation lever 51 to rotate to the package body 59 side, the operation lever 51 can be stably kept folded on the package body 59. Thus, the sudden falling of operation lever 51 and a disturbance in operation caused thereby can be prevented.

Further, since the engaging portion 54 is provided on the package body 59 to retain the operation lever 51 in state of being folded, the operation lever 51 can be more stably kept folded. Thereby, the springy force of spring 53 can be set sufficiently weakly. Therefore, the spring 53 does not damage easiness in rotating the operation lever 51.

Figure 21:
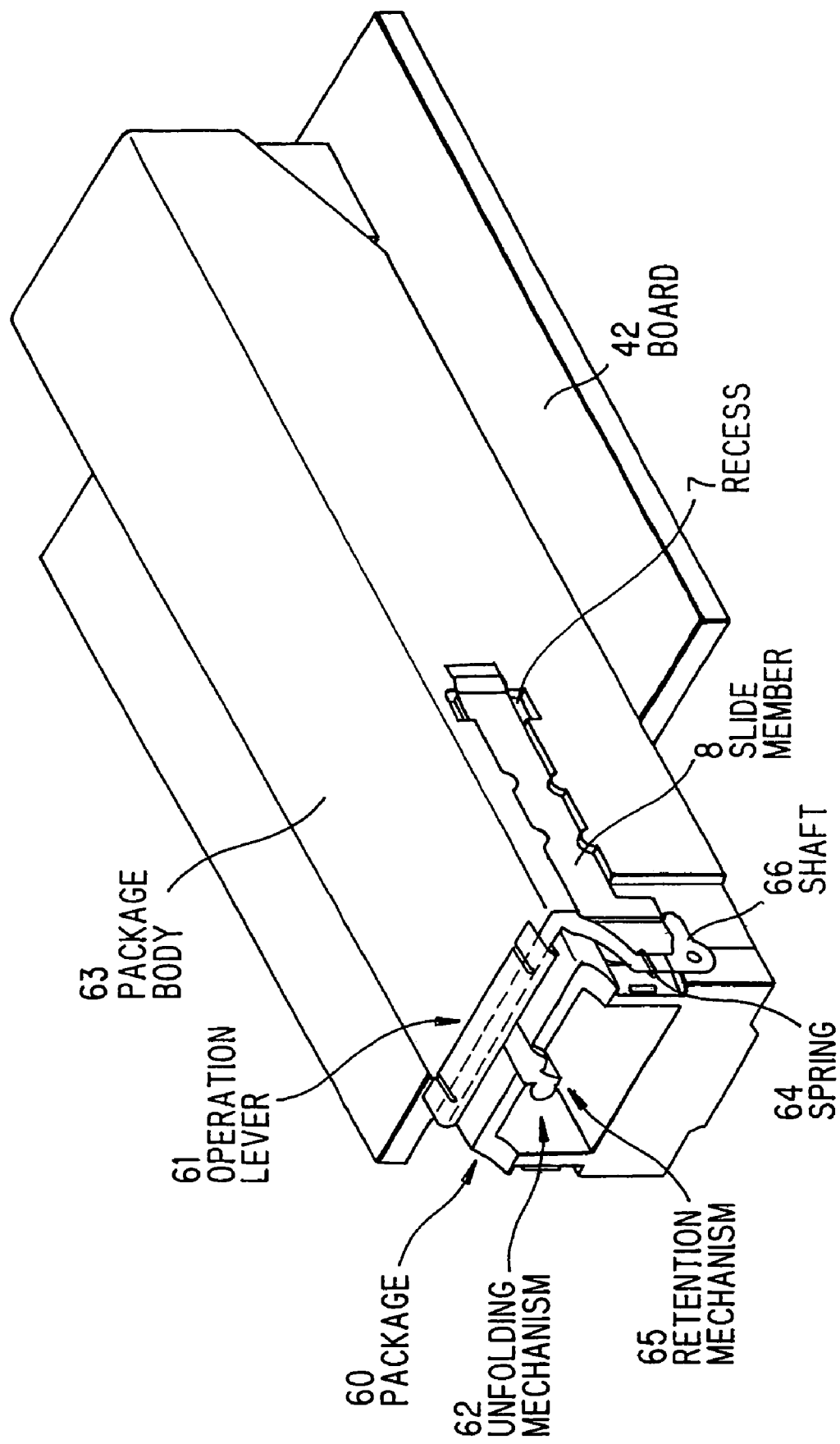
FIG. 21 is a perspective view showing a package 60 with lock mechanism in a third preferred embodiment of the invention.

FIG. 21 is a perspective view showing a package 60 with lock mechanism in the third preferred embodiment of the invention. In this embodiment, the package 60 is provided with an unfolding mechanism 62 to unfold an operation lever 61 by fingertip operation. Like components are indicated same numerals used in the first embodiment and explanations thereof are omitted below.

Figure 22:
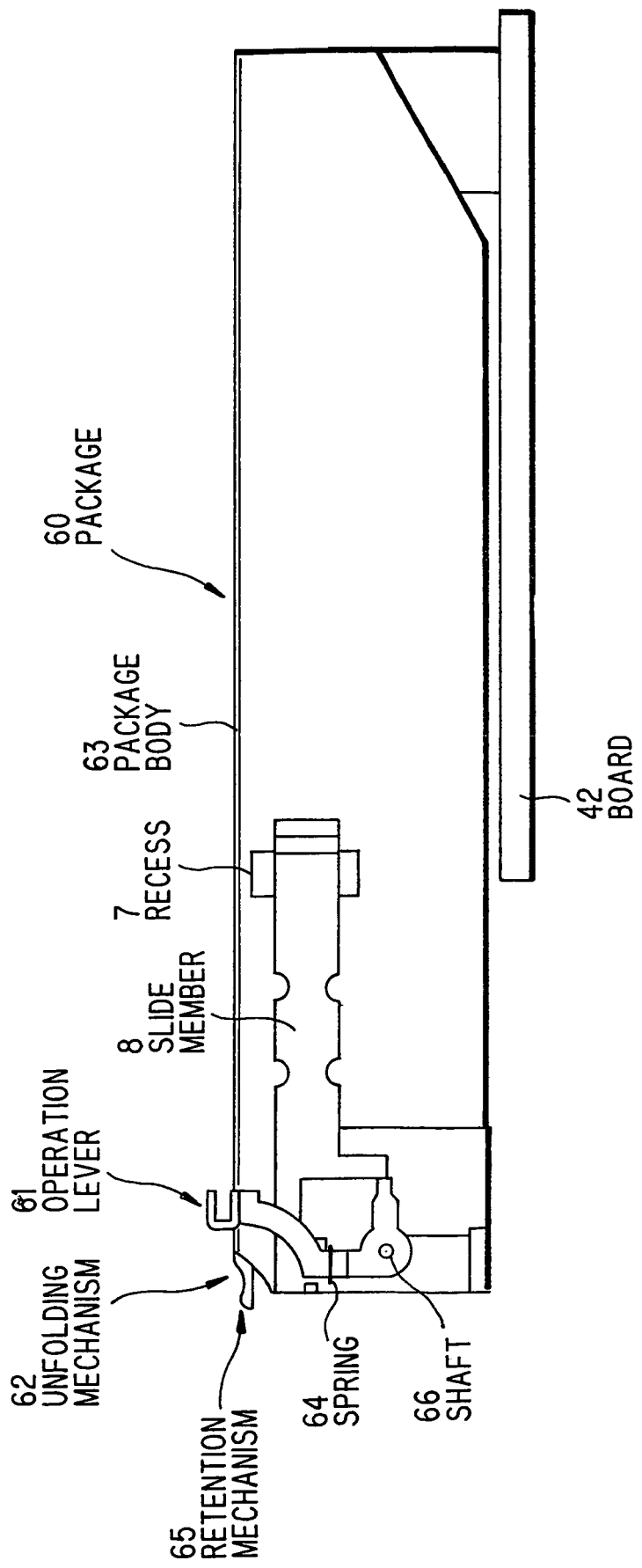
FIG. 22 is a side view showing the package 60 in FIG. 21.

As shown in FIGS. 21 and 22, the unfolding mechanism 62 is composed of: a spring 64 that is provided between a package body 63 and the operation lever 61 to energize the operation lever 61 to rotate in the unfolded direction; and a retention mechanism 65 that is attached to the package body 63 to retain the operation lever 61 against the springy force of spring 64.

The spring 64 is a coil spring wounded around a shaft 56 of the operation lever 61, and its one end is attached to the package body 63 and the other end is attached to the operation lever 61. The spring 64 has such a minimum springy force that allows the operation lever 61 to be easily rotated with finger.

Figure 23:
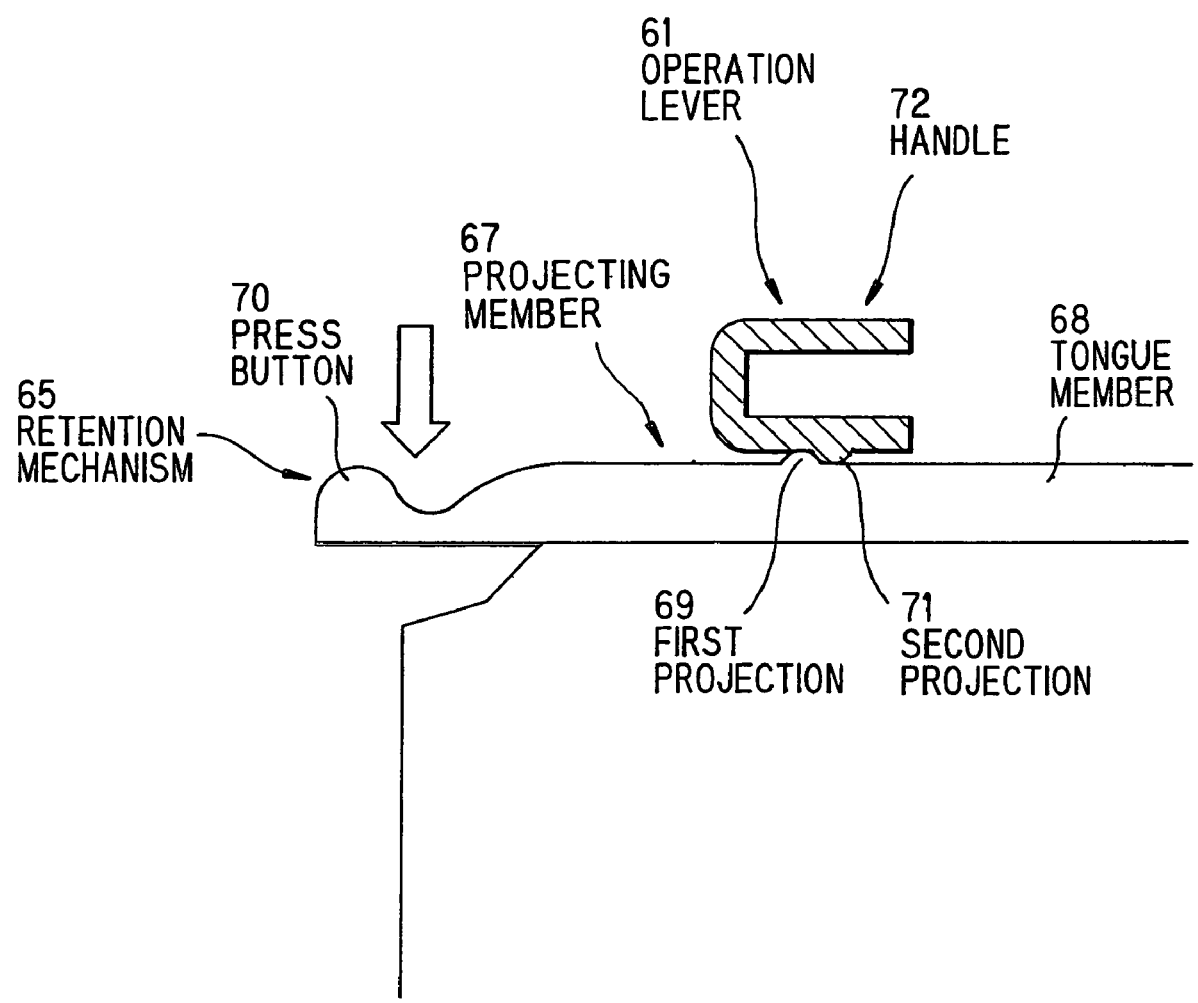
FIG. 23 is a partial cross sectional view showing the package 60 in FIG. 22.

As shown in FIG. 23, the retention mechanism 65 includes a projecting member 67 that is attached to the package body 63 flexibly in the vertical. For example, the projecting member 67 is composed of a tongue member 68 formed on the top front-end of package body 63 and a first projection 69 that is formed on the tongue member 68.

The tongue member 68 is provided between slits formed in parallel extending backward from the front end of package body 63 and has its free end projecting forward from the package body 63. The tongue member 68 can be bent downward by pressing down a press button 70 formed at the front end of tongue member 68.

The first projection 69 is formed longitudinally in the middle of tongue member 68 and can be moved downward to depart from the operation lever 61 by bending the tongue member 68 downward. Further, the operation lever 61 is provided with a second projection 71 to well engage to the first projection 69. The second projection 71 is formed projecting outside of an handle 72 bridged between the arms 15 of operation lever 61, and it restricts the rotation of operation lever 61 by contacting the first projection 69 when the operation lever 61 is in state of raised up and folded on the package body 63.

The functions of package 60 in this embodiment will be described below.

Figure 24:
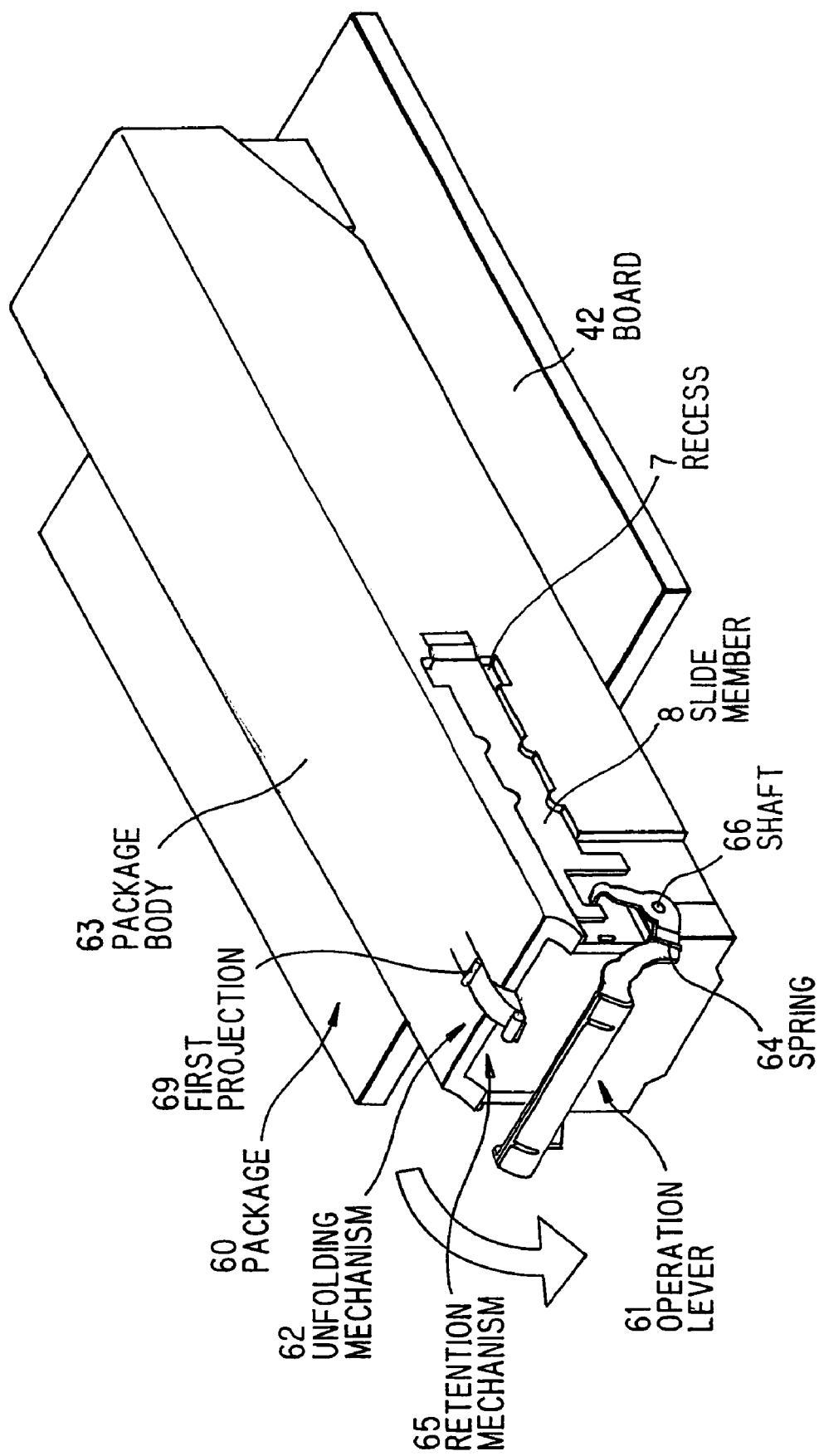
FIG. 24 is a perspective view showing the package 60 with an operation lever 61 being disengaged.
Figure 25:
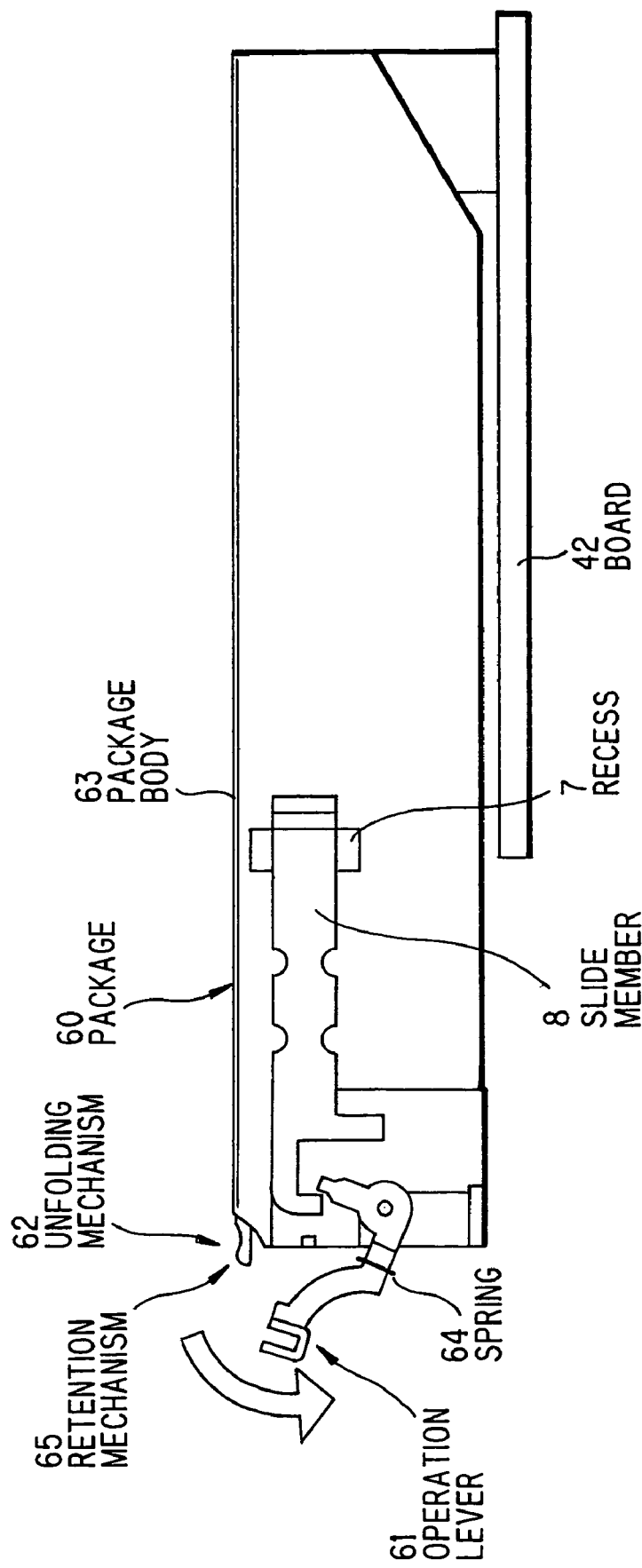
FIG. 25 is a side view showing the package 60 in FIG. 24.
Figure 26:
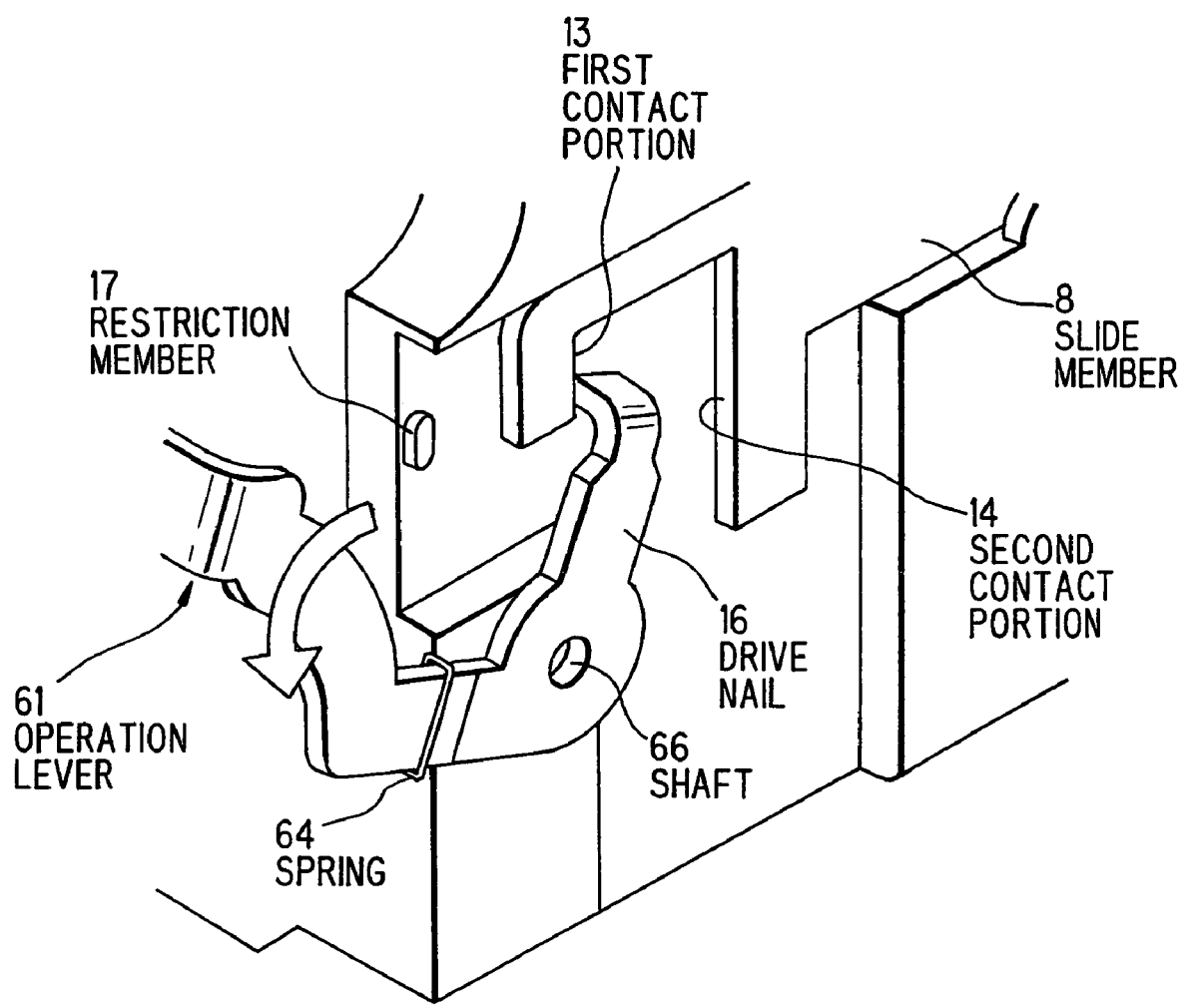
FIG. 26 is a partial enlarged view showing the package 60 in FIG. 24.

In case of extracting the package 60 from the cage (not shown), the press button 70 is pressed down. As the tongue member 68 is bent downward, the first projection 69 moves downward. Thereby, the first projection 69 departs from the second projection 71 and the operation lever 61 rotates forward by the springy force of spring 64. As shown in FIGS. 24, 25 and 26, when the drive nail 16 contacts the first contact portion 13 of slide member 8, the operation lever 61 stops rotating. Then, by pressing down the operation lever 61, the slide member 8 can be slid forward to release the locking.

In case of loading the package 60 into the cage, the package 60 is inserted into the cage while keeping the operation lever 61 folded. During this process, the operation lever 61 is restricted by the first projection 69 in its rotation direction. Therefore, it does not fall forward in that process. Thus, the loading operation can be stably performed.

Since the spring 64 is provided between the package body 63 and the operation lever 61 to energize the operation lever 61 to rotate in the unfolded direction and the retention mechanism 65 is attached to the package body 63 to retain the operation lever 61 against the springy force of spring 64, the operation lever 61 can be easily felt forward by releasing the operation lever 61 from the retention mechanism 65. Thus, the package 60 can be taken out of the cage.

Further, since the retention mechanism 65 includes the projecting member 67 that is attached to the package body 63 flexibly in the vertical direction, the operation lever 61 can be easily released from the retention mechanism 65.

Figure 27:
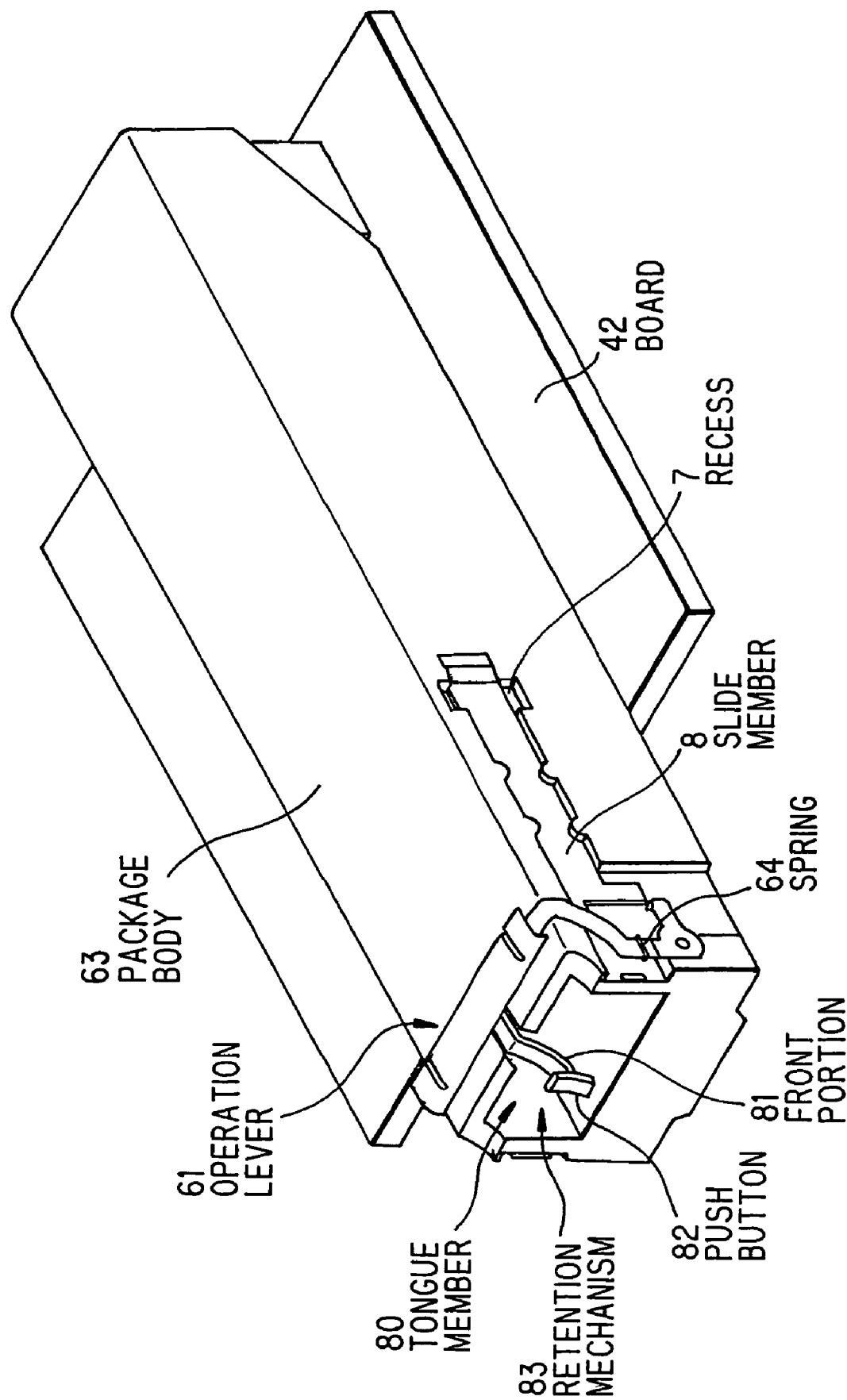
FIG. 27 is a perspective view showing the package 60 in the third embodiment with another retention mechanism 83.
Figure 28:
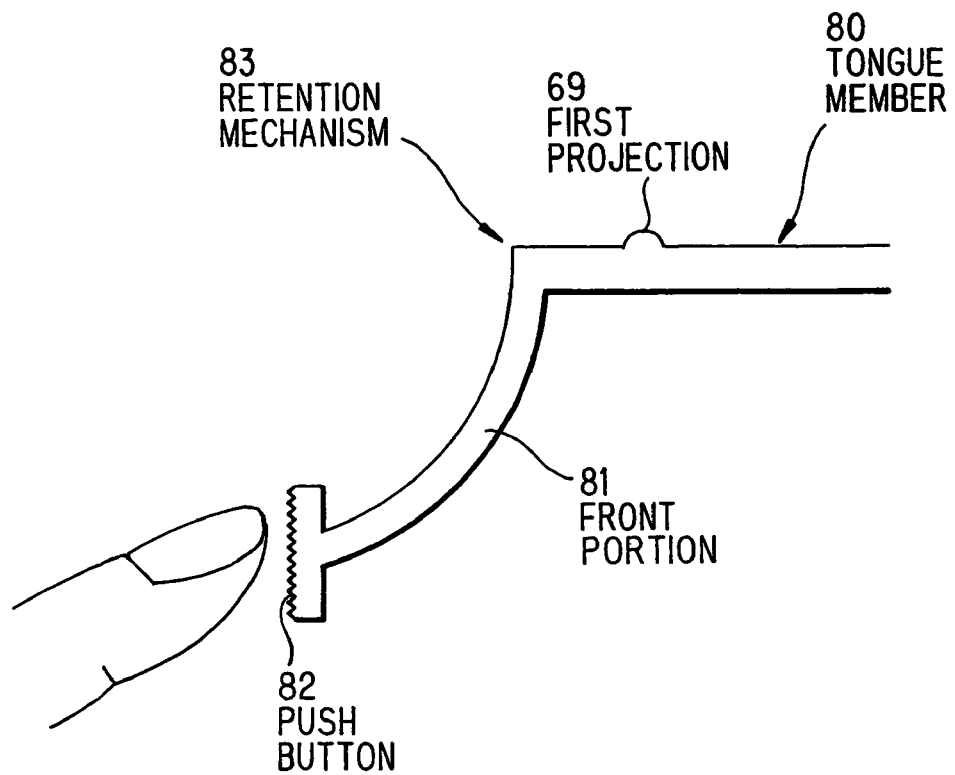
FIG. 28 is a side view showing the retention mechanism 83 in FIG. 27.
Figure 29:
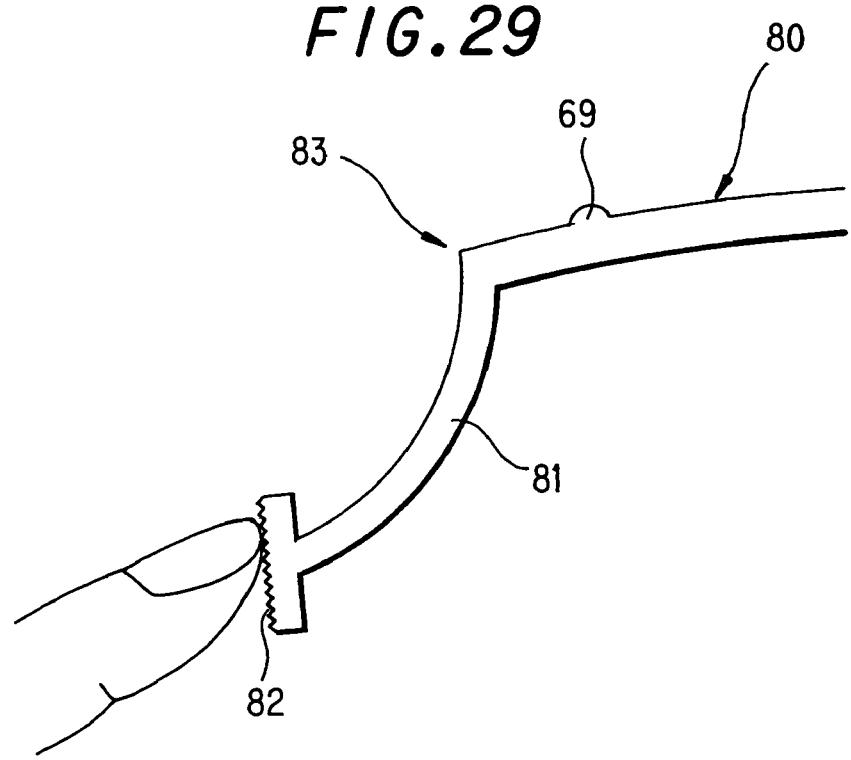
FIG. 29 is a side view showing the retention mechanism 83 with a push button 82 being pushed backward.

Although in this embodiment the press button 70 is formed at the front end of tongue member 68 and the tongue member 68 is bent downward by pressing down the press button 70, the invention is not limited to this embodiment. For example, as shown in FIGS. 27 and 28, in an alternative retention mechanism 83, a press button 82 may be formed at the front end of a tongue member 80 while bending downward the front portion 81 of tongue member 80. In this case, as shown in FIG. 29, by pressing backward the press button 82, the tongue member 80 can be bent downward. Thus, the operation lever 61 can be easily released from the retention mechanism 83.

Figure 30:
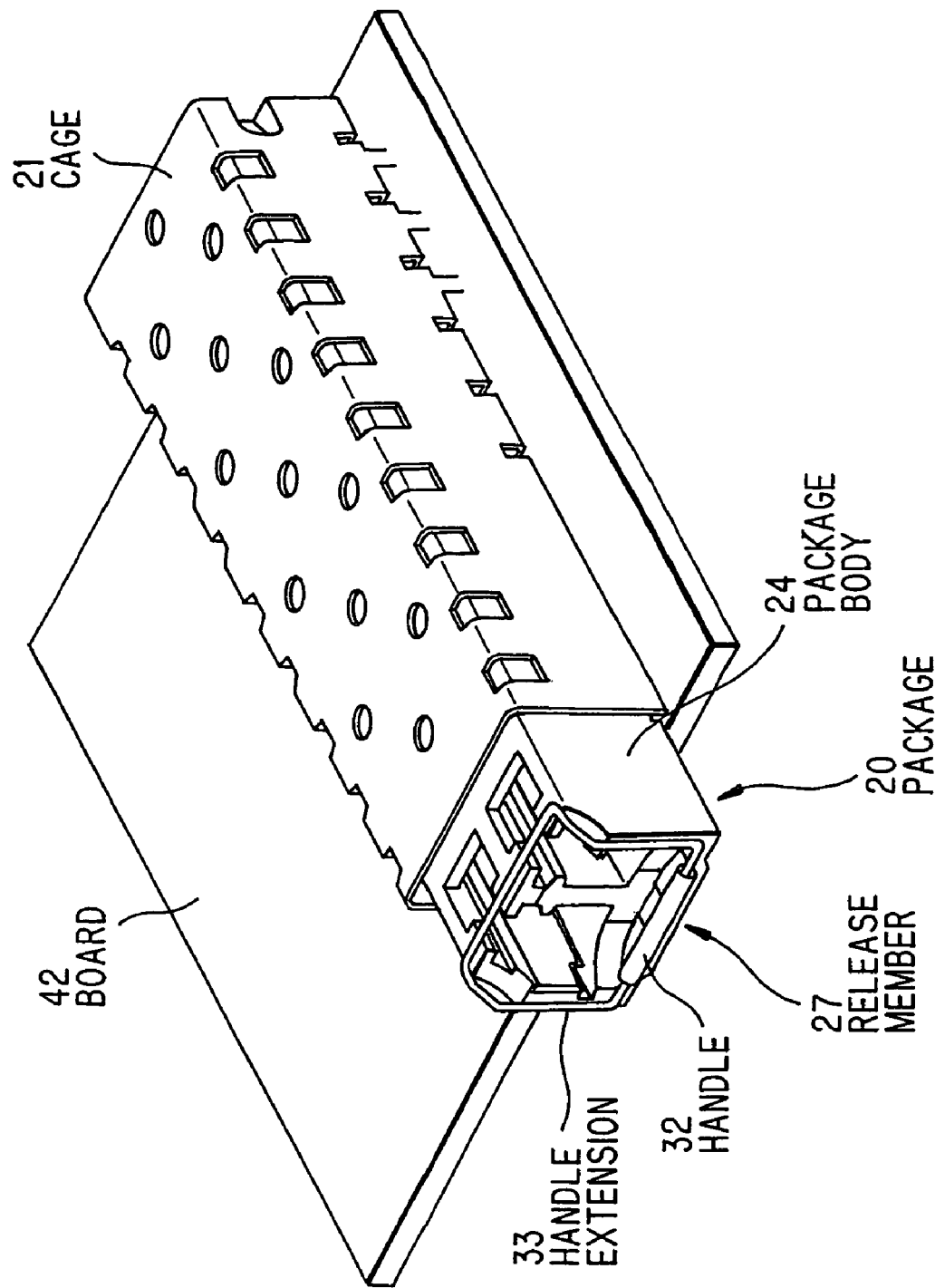
FIG. 30 is a perspective view showing a package 20 with lock mechanism in a fourth preferred embodiment of the invention.

FIG. 30 is a perspective view showing a package 20 with lock mechanism in the fourth preferred embodiment of the invention in state of being loaded into a cage 21.

Figure 34:
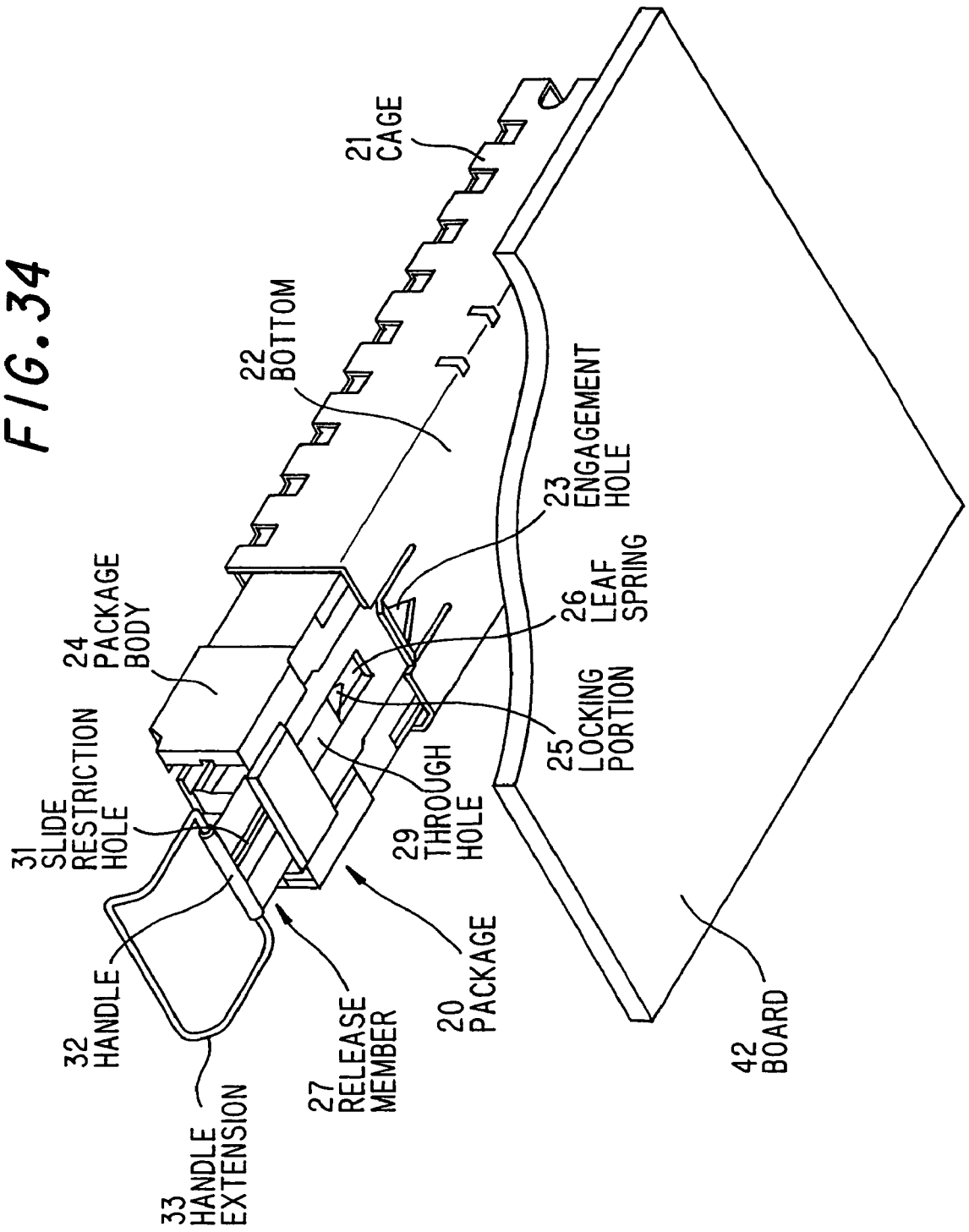
FIG. 34 is a partially broken perspective view showing the package 20 in FIG. 33 while viewing it from its bottom side.
Figure 35:
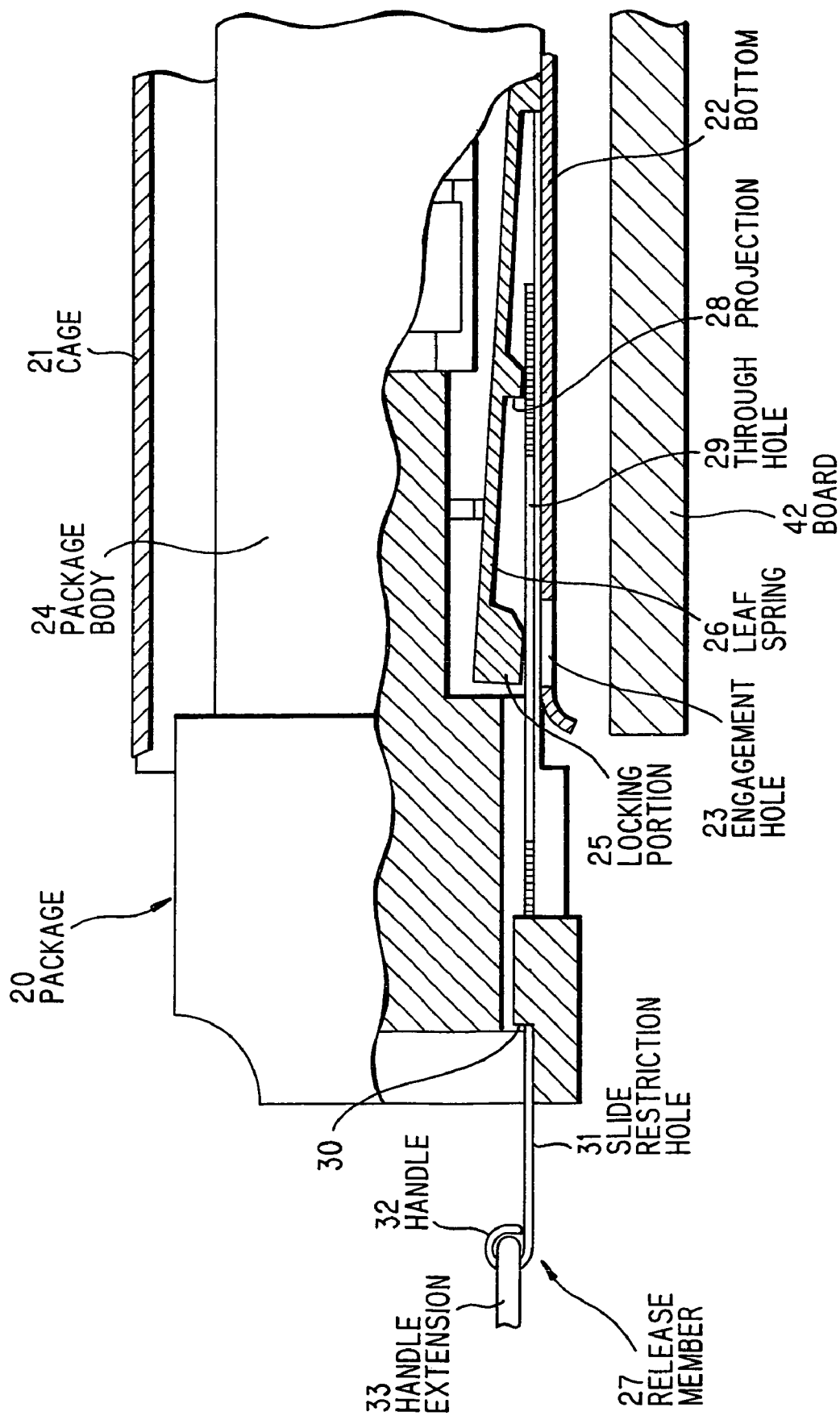
FIG. 35 is a partially cross-sectioned side view showing the package 20 in FIG. 32.

As shown in FIGS. 34 and 35, the cage 21 has a vertically penetrating engagement hole 23 on its bottom 22. The package body 24 of package 20 has a retractable locking portion 25 projecting downward to be fitted into the engagement hole 23 to lock the package 20. The locking portion 25 is provided on one end (free end) of a leaf spring 26, the other end of which is attached to the bottom of package body 24, and can be retracted inside the package body 24 when the leaf spring 26 is bent. A projection 28 is provided in the middle of leaf spring 26 such that it allows the leaf spring 26 to bend inside the package body 24 when it gets on a release member 27, described below.

Figure 32:
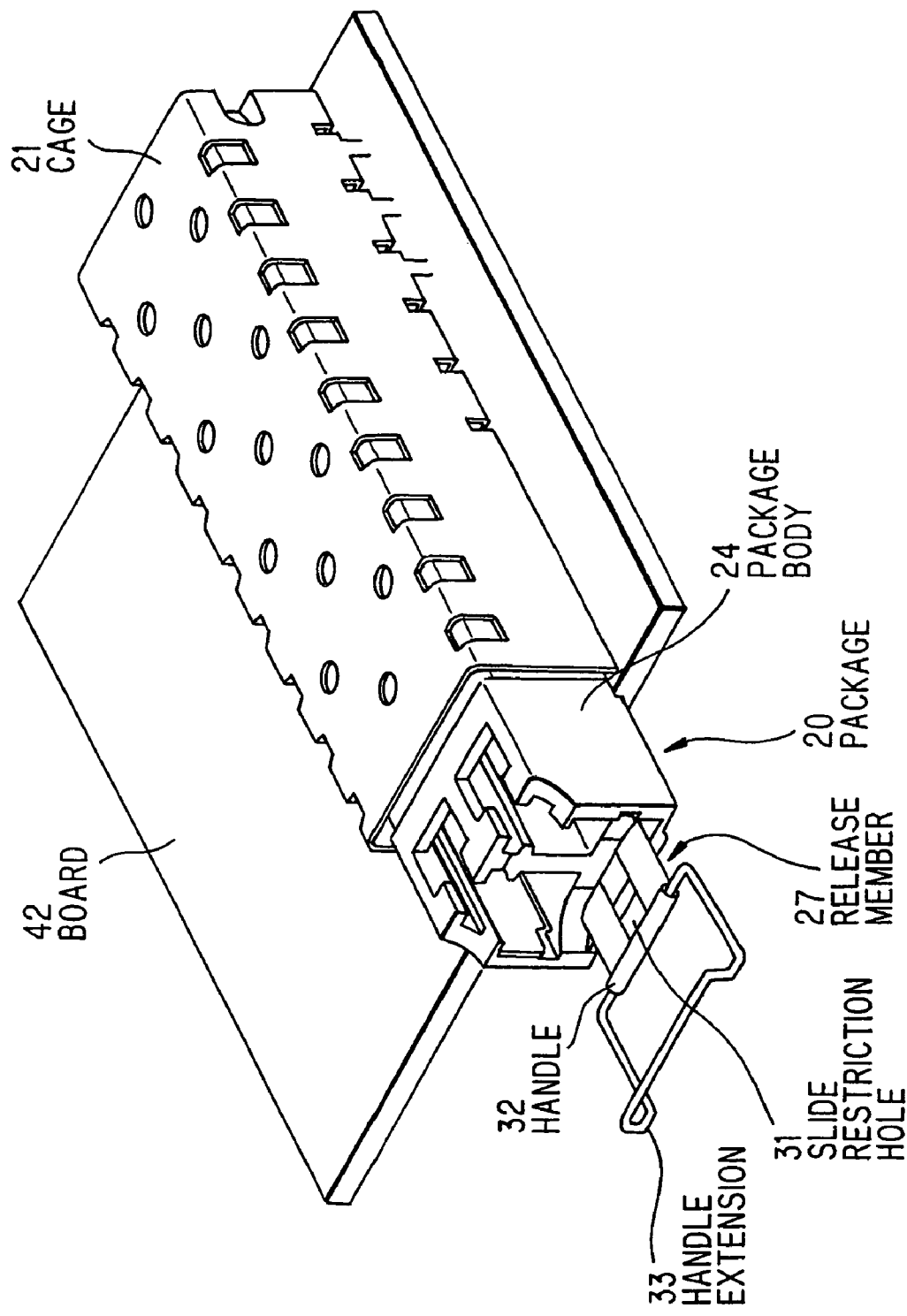
FIG. 32 is a perspective view showing the package 20 in state of being released from the locking by pulling the handle extension 33.

The release member 27 has a through hole 29 to receive the locking portion 25 and projection 28 and a slide restriction hole 31 to receive a stopper 30 formed on the front side of package body 24 to restrict the slide range of release member 27. The release member 27 is slidably in its longitudinal direction (in the slide direction of package 20)

attached on the bottom of package body 24. The release member 27 is, as shown in FIG. 30, in state of being loaded (inserted) in the package body 24 while allowing the locking portion 25 to protrude through the through hole 29 and to be inserted into the engagement hole 23, and it is, as shown in FIG. 32, in state of being extracted from the package body 24 while, as shown in FIG. 35, allowing the projection 28 to get on its plate portion other than the through hole 29 and allowing the locking portion 25 to be retracted inside the package body 24.

As shown in FIGS. 30 and 35, a handle 32 is provided on the front end of release member 27. A handle extension 33 to extend the handle 32 is attached to the handle 32 rotatably around the axis of handle 32 to bridge a pair of release members 27.

The handle extension 33 has a shape of rectangular frame such that it lies along the front-end circumference of package body 24 while being raised up along the front-end of package body 24 and extended upward from the handle 32 when the release member 27 is loaded in the package body 24.

Figure 36:
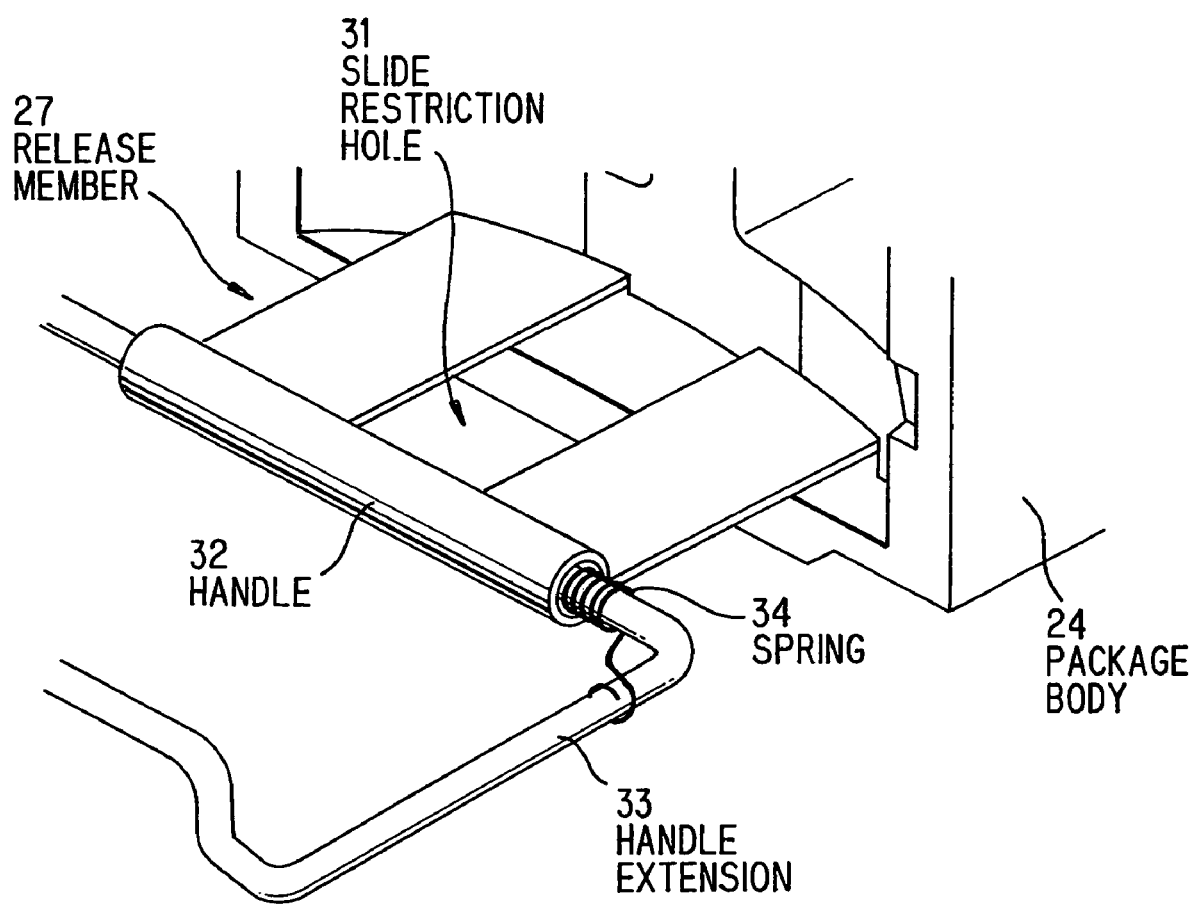
FIG. 36 is an enlarged perspective view showing the package 20 in FIG. 32.

As shown in FIG. 36, a spring 34 is provided between the handle 32 and handle extension 33 such that it energizes the handle extension 33 to be folded. For example, the spring 34 is of a coil spring wounded around the handle extension 33, and its one end is attached to the handle 32 and the other end is attached to the handle extension 33. The spring 34 has such a minimum springy force that is required to fold the handle extension 33.

The functions of package 20 in this embodiment will be described below.

As shown in FIG. 30, easier one of the handle 32 and handle extension 33 to hold with finger is pulled forward when extracting the package 20 being locked by the cage 21 from the cage 21.

Figure 31:
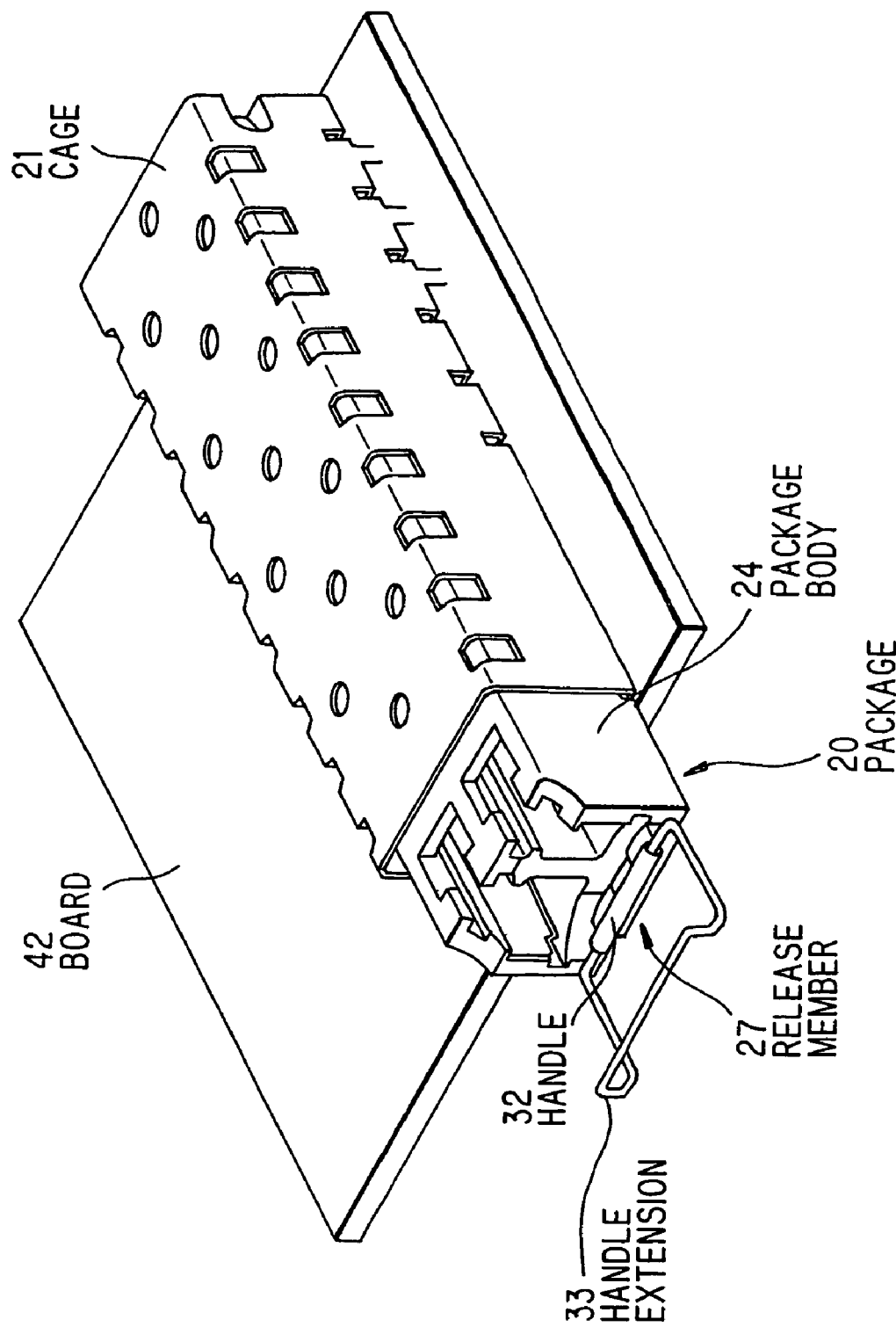
FIG. 31 is a perspective view showing the package 20 with a handle extension 33 being rotated.

As shown in FIG. 31, in pulling the handle extension 33, the handle extension 33 is rotated forward around the handle 32 of release member 27 until being nearly horizontally extended. Since the rotation resistance of handle extension 33 is only the weak spring 34 and the handle extension 33 has a sufficiently reduced weight, the handle extension 33 is easy to draw.

After the handle extension 33 is extended forward, nothing interferes with the operation of handle extension 33. Then, the handle extension 33 is held further securely with finger.

Then, as shown in FIGS. 23 and 35, when the handle extension 33 is further pulled, the release member 27 is drawn forward from the inside of package body 24 and the projection 28 gets on the release member 27. Thereby, the leaf spring 26 is bent turning its free end upward while allowing the locking portion 25 to be retracted inside the package body 24. Thus, the locking of cage 21 and package 20 is released.

Figure 33:
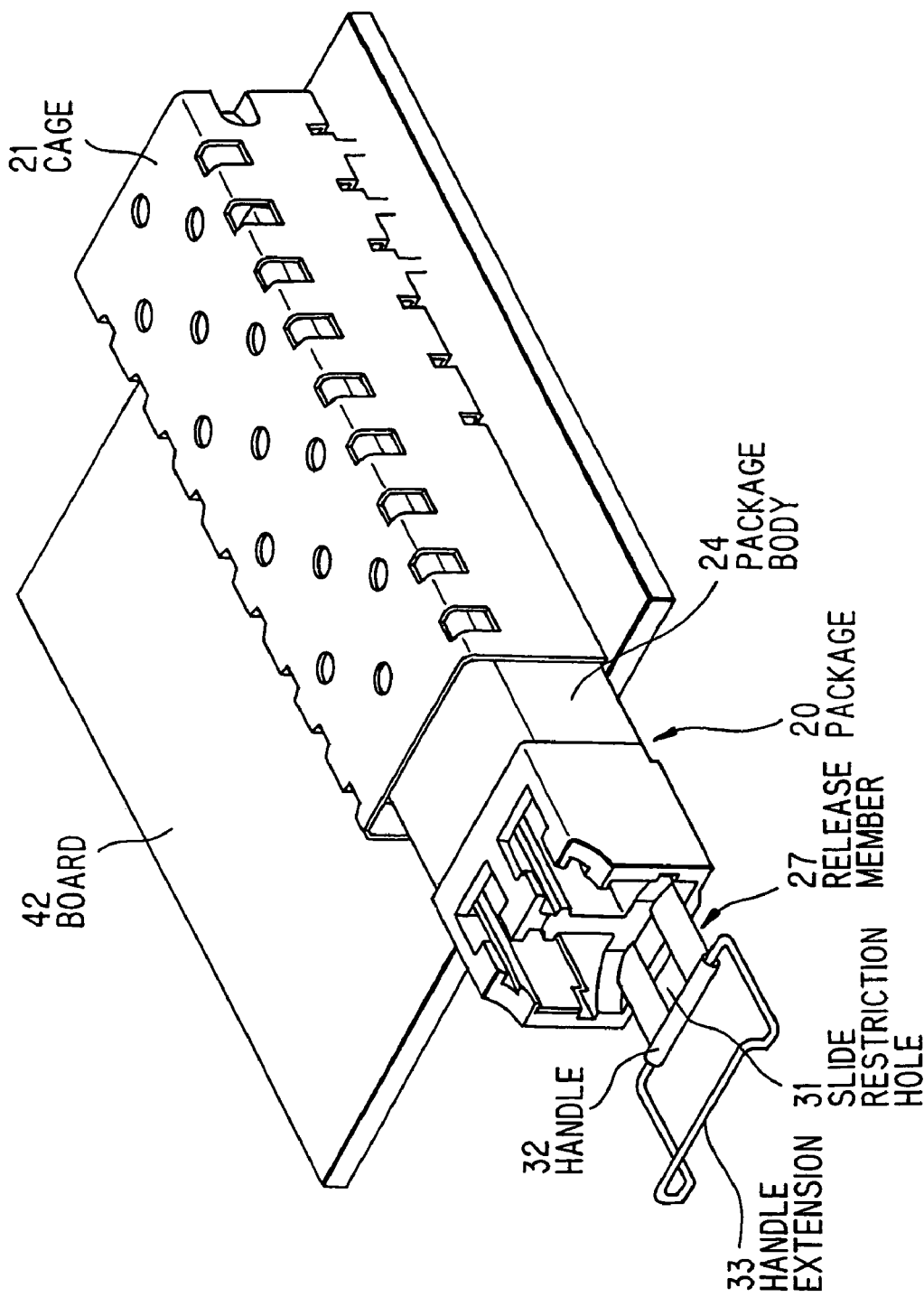
FIG. 33 is a perspective view showing the package 20 in state of being extracted from a cage 21 by pulling the handle extension 33.

Then, when the handle extension 33 is further pulled, the release member 27 contacts the stopper 30 and is thereby made to stop the slide along the package body 24 and to draw the package body 24 forward. Since the locking of package body 24 to cage 21 is now released, the package body 24 can be easily taken out of the cage 21 as shown in FIG. 33.

On the other hand, in case of pulling directly the handle 32 of release member 27, the handle extension 33 is kept in its raised-up position even when it departs from the package body 24 and, therefore, it does not interfere with that operation.

Further, since the handle extension 33 is provided extending the handle 32 of release member 27, the release of locking is easily performed by operating the handle extension 33 even when it is difficult to hold the handle 32. Thus, the package 20 can be taken out from the cage 21.

The handle 32 is provided at the front end of the release member 27 slidably in the extraction/insertion direction attached to the package body 24 and the handle extension 33 is rotatably attached to the handle 32. Therefore, the handle extension 33 can be easily folded along the package body 24.

The spring 34 is provided between the handle 32 and handle extension 33 such that it energizes the handle extension 33 to be folded. It keeps folding the handle extension 33 when the handle extension 33 is not operated. Thus, the handle extension 33 thus folded does not disturb the other operation.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A package with lock mechanism, comprising:
    a package body to be releasably locked by a cage; and
    a release mechanism that is attached to the package body, the release mechanism enabling the release of locking of the package body and the cage;
    wherein the release mechanism provides, between an operation member to be operated in the release of locking and a follower member to be driven by the operation member, an allowance to allow an initial movement of the operation member to be independent of the follower member.

* * * * *